US008874353B2

(12) United States Patent
Shinagawa et al.

(10) Patent No.: US 8,874,353 B2
(45) Date of Patent: Oct. 28, 2014

(54) DEVICE AND METHOD FOR CONTROLLING INTERNAL COMBUSTION ENGINE

(75) Inventors: Tomohiro Shinagawa, Sunto-gun (JP); Yuuichi Katou, Susono (JP); Youhei Hosokawa, Susono (JP); Shingo Korenaga, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1144 days.

(21) Appl. No.: 12/738,916

(22) PCT Filed: Nov. 5, 2008

(86) PCT No.: PCT/IB2008/002956
§ 371 (c)(1),
(2), (4) Date: Apr. 20, 2010

(87) PCT Pub. No.: WO2009/060287
PCT Pub. Date: May 14, 2009

(65) Prior Publication Data
US 2010/0235074 A1 Sep. 16, 2010

(30) Foreign Application Priority Data
Nov. 6, 2007 (JP) ................................ 2007-288757

(51) Int. Cl.
*G06F 19/00* (2011.01)
*G06G 7/70* (2006.01)
*F02D 41/12* (2006.01)
*F02D 41/00* (2006.01)
*F02D 41/18* (2006.01)

(52) U.S. Cl.
CPC ...... *F02D 41/126* (2013.01); *F02D 2041/0017* (2013.01); *F02D 41/0072* (2013.01); *F02D 41/182* (2013.01)
USPC ........... 701/112; 701/103; 123/326; 123/325; 123/332; 123/198 DB; 123/333; 60/285

(58) Field of Classification Search
USPC .................. 123/198 DB, 325, 326, 332, 333; 60/285; 701/103, 104, 110, 112
See application file for complete search history.

(56) References Cited

U.S. PATENT DOCUMENTS 4,391,243 A * 7/1983 Bessho ......................... 123/325
4,508,088 A * 4/1985 Hasegawa et al. ............ 123/493
(Continued)

FOREIGN PATENT DOCUMENTS

DE 196 04 136 A1 8/1997
DE 197 34 227 A1 2/1998
(Continued)

OTHER PUBLICATIONS

Written Opinion issued for International Application No. PCT/IB32008/002956 on Jun. 3, 2009.
International Search Report issued for International Application No. PCT/IB2008/002956 on Jun. 3, 2009.
Office Action issued for Japanese Patent Application No. 2007-288757 on Sep. 4, 2009 (with translation).

*Primary Examiner* — Hieu T Vo
*Assistant Examiner* — Sherman Manley
(74) *Attorney, Agent, or Firm* — Oliff PLC

(57) ABSTRACT

An internal combustion engine is provided in which a prescribed amount of fuel is injected over a predetermined period until an air-fuel ratio sensor is activated when fuel cut control of the internal combustion engine is stopped to resume normal engine operation. If an EGR gas is inducted immediately before the fuel cut control is started, the prescribed amount is reduced.

9 Claims, 15 Drawing Sheets

(56) References Cited

U.S. PATENT DOCUMENTS

| | | | | |
|---|---|---|---|---|
| 4,510,911 | A * | 4/1985 | Otobe | 123/493 |
| 4,782,810 | A * | 11/1988 | Shimoda et al. | 123/478 |
| 4,889,100 | A | 12/1989 | Nakaniwa et al. | |
| 4,964,271 | A * | 10/1990 | Sawada et al. | 60/274 |
| 4,964,272 | A * | 10/1990 | Kayanuma | 60/274 |
| 5,440,877 | A * | 8/1995 | Kamura et al. | 60/274 |
| 5,839,409 | A | 11/1998 | Denz et al. | |
| 5,894,827 | A | 4/1999 | Kamura et al. | |
| 6,003,489 | A * | 12/1999 | Kamura et al. | 123/305 |
| 7,051,514 | B2 * | 5/2006 | Midlam-Mohler | 60/278 |
| 2002/0139357 | A1 * | 10/2002 | Kawaguchi et al. | 123/568.21 |
| 2004/0102288 | A1 * | 5/2004 | Ayabe et al. | 477/117 |
| 2009/0223221 | A1 * | 9/2009 | Onishi et al. | 60/603 |
| 2010/0186726 | A1 * | 7/2010 | Takagi | 123/568.16 |

FOREIGN PATENT DOCUMENTS

| | | |
|---|---|---|
| EP | 1 790 843 A1 | 5/2007 |
| EP | 1 816 334 A1 | 8/2007 |
| JP | A 4-175449 | 6/1992 |
| JP | A 6-257518 | 9/1994 |
| JP | A 7-224726 | 8/1995 |
| JP | A 8-240139 | 9/1996 |
| JP | A 2000-104604 | 4/2000 |
| JP | A 2002-256919 | 9/2002 |
| JP | A 2004-197704 | 7/2004 |
| JP | A 2006-329065 | 12/2006 |

* cited by examiner

DEVICE AND METHOD FOR CONTROLLING INTERNAL COMBUSTION ENGINE

BACKGROUND OF THE INVENTION

1. Field of the Invention

The present invention relates to a system and method for controlling an internal combustion engine.

2. Description of the Related Art

In recent years, exhaust gas recirculation (EGR) devices that recirculates a portion of exhaust gas to an intake system have been used in internal combustion engines to improve the fuel economy and reduce the amount of nitrogen oxides (NOx) contained in exhaust gas.

If the amount of exhaust gas recirculated by the EGR device (EGR gas) is insufficient, the fuel economy does not improve and NOx cannot be reduced sufficiently. If the amount of EGR gas is excessive, on the other hand, the performance of the engine may be affected. For example, combustion may become unstable, thereby causing misfires.

In general, when internal combustion engines are decelerating, a fuel cut control, in which a throttle valve is fully closed and fuel injection is stopped, is executed to suppress waste of fuel and an increase in the temperature of a catalyst provided in the exhaust system.

When the fuel cut control for deceleration operation is stopped so that normal operation of the engine may resume, the temperature of an air-fuel ratio sensor provided in the exhaust system has decreased and the air-fuel ratio sensor has lost its activity, and therefore feedback control of the air-fuel ratio cannot be restarted immediately. Thus, fuel injection is restarted using a prescribed fuel injection amount until the air-fuel ratio sensor becomes able to function properly. In many cases, the "prescribed amount" is determined according to the amount of intake air detected by an air flow meter when the fuel cut control is stopped.

Now, the effect of EGR gas at the time when the fuel cut control is stopped to resume normal operation is considered. If EGR is performed by the EGR device described above when the fuel cut control is started, some EGR gas may not have been scavenged but remains in the intake system even when the fuel cut control is stopped. In this way, the amount of fresh air that is actually inducted into a cylinder is less than the amount of air detected by the air flow meter when the fuel cut control is stopped. As a result, the air-fuel ratio may become excessively rich, which may cause unstable combustion such as misfires.

The limit of the amount of EGR gas that may be inducted into the cylinder increases with increasing load on or increasing speed of the internal combustion engine. That is, when the fuel cut control is stopped to resume normal operation and when the internal combustion engine is operating under a low load and at a low speed, the limit of the amount of EGR gas that may be inducted into the cylinder is low. Thus, if the amount of EGR gas remaining in the intake system when the fuel cut control is stopped exceeds the limit, combustion may become unstable.

One of the techniques related to EGR gas remaining in intake systems is made to solve the problem that EGR gas remaining in an exhaust system of a hybrid vehicle (HV) is not purified by a catalyst when fuel is cut during deceleration. In this technique, a clutch between a motor and an engine is engaged for motoring and a throttle valve is fully opened during deceleration to feed the remaining EGR gas to the catalyst for purification (see Japanese Patent Application Publication No. 2002-256919 (JP-A-2002-256919)).

Although the remaining EGR gas can be scavenged efficiently, this technique is not applicable to vehicles other than HVs. In addition, the deceleration feel is diminished because the throttle valve is fully opened during deceleration, which is another disadvantage.

Other proposed related arts include a technique to suppress a decrease in amount of intake air to be charged, due to EGR gas remaining in an intercooler, by causing the intake air to bypass the intercooler when operation of an internal combustion engine is shifted from an EGR induction region to a non-EGR induction region (see Japanese Patent Application Publication No. 6-257518 (JP-A-6-257518)).

SUMMARY OF THE INVENTION

The present invention provides a technique that can provide a sufficient deceleration feel when fuel cut control is started with EGR gas present in an intake system of an internal combustion engine, and that can suppress unstable combustion such as misfires when the fuel cut control is stopped to resume normal operation.

A first aspect of the present invention is directed to an internal combustion engine in which a prescribed amount of fuel is injected over a predetermined period until an air-fuel ratio sensor is activated when fuel cut control of the internal combustion engine is stopped to resume normal operation. It is characterized in that the prescribed amount is modified according to the amount of EGR gas present in an intake system when the fuel cut control is stopped (hereinafter occasionally referred to as "remaining EGR gas amount").

More specifically, the first aspect of the present invention includes: an EGR assembly that has an EGR passage to communicate an exhaust passage and an intake passage of the internal combustion engine and an EGR valve to control an amount of exhaust gas that passes through the EGR passage, and that recirculates a portion of exhaust gas to the intake passage as EGR gas; a fuel cut control section that executes fuel cut control, in which fuel injection in the internal combustion engine is stopped, when the internal combustion engine is decelerating; and a deceleration-cancellation fuel injection control section that, when the internal combustion engine stops decelerating and the fuel cut control is stopped, injects a prescribed amount of fuel for a predetermined period after the fuel cut control is stopped such that the prescribed amount when an amount of EGR gas present in an intake system of the internal combustion engine is larger is equal to or smaller than that when the amount of such EGR gas is smaller.

Here, when the fuel cut control of the internal combustion engine is stopped, the activity of the air-fuel ratio sensor which is provided in an exhaust system of the internal combustion engine has been lost, and therefore it may be difficult to decide the fuel injection amount by feedback control based on the air-fuel ratio. Thus, a prescribed amount of fuel is injected by deceleration-cancellation fuel injection control section until the air-fuel ratio sensor is activated.

The prescribed amount is set based on the amount of intake air detected by an air flow meter at that time to such an amount of fuel that will result in an appropriate air-fuel ratio. In the case where EGR gas remain in the intake system when the fuel cut control is stopped and has not been scavenged when the internal combustion engine is brought out of the deceleration state to resume normal operation, however, injecting the prescribed amount of fuel described above would reduce the amount of fresh air by the amount of EGR gas mixed in the intake air to be inducted into a cylinder, which might result in an excessively rich air-fuel ratio. In this case, combustion might become unstable to cause misfires when the internal combustion engine is brought out of the deceleration state to resume normal operation.

So, in the first aspect of the present invention, the prescribed amount, in the case where the amount of EGR gas remaining when the fuel cut control is stopped is larger, is made equal to or smaller than that when the amount of such EGR gas is smaller. That is, the prescribed amount is made smaller as the amount of EGR gas remaining when the fuel cut control is stopped is larger, for example.

In this case, the relationship between the remaining EGR gas amount and the prescribed amount may be denied such that the prescribed amount decreases linearly or along a designated curve, or the prescribed amount decreases in two or more steps or in a multi-stepped manner, as the remaining EGR gas amount increases. Alternatively, the prescribed amount may be varied in two steps depending on whether any EGR gas remains in the intake system when the fuel cut control is stopped. In this case, the prescribed amount may be made smaller in the case where any EGR gas remains than hi the case where any EGR gas does not remain.

Consequently, it is possible to prevent the air-fuel ratio of the intake air to be inducted into the cylinder from becoming excessively rich, and suppress the occurrence of unstable combustion and misfires of the engine, for a predetermined period after the fuel cut control is stopped. It is also possible to give the driver a sufficient deceleration feel because the throttle valve is not kept fully open during deceleration unlike the related art.

In the first aspect of the present invention, the amount of EGR gas present in the intake system of the internal combustion engine when the fuel cut control is stopped may be estimated based on at least one of an operational state of the internal combustion engine and a state of the EGR assembly immediately before the fuel cut control is executed.

Here, there is strong correlation between an operational state of the internal combustion engine and the amount of EGR gas that is recirculated in that operational state. Thus, the amount of EGR gas present in the intake system of the internal combustion engine immediately before the fuel cut control is executed may be estimated with high precision by learning the operational state of the internal combustion engine immediately before the fuel cut control is executed. Once the amount of EGR gas present in the intake system of the internal combustion engine immediately before execution of the fuel cut control is known, the amount of EGR gas present in the intake system of the internal combustion engine when the fuel cut control is stopped (remaining EGR gas amount) may also be estimated with high precision. According to this configuration, the remaining EGR gas amount may be estimated more easily. Accordingly, the prescribed amount may be obtained more easily.

There is also strong correlation between the state of the EGR assembly and the amount of EGR gas to be recirculated by the EGR assembly. Examples of the state of the EGR assembly include EGR valve opening degree, intake air pressure, EGR gas temperature, and exhaust pressure. The amount of EGR gas present in the intake system of the internal combustion engine immediately before the fuel cut control is executed may be estimated with high precision by learning the state of the EGR assembly immediately before the fuel cut control is executed. Once the amount of EGR gas present in the intake system of the internal combustion engine immediately before the fuel cut control is executed is known, the amount of EGR gas present in the intake system of the internal combustion engine when the fuel cut control is stopped (remaining EGR gas amount) may also be estimated with high precision.

The amount of EGR gas present in the intake system of the internal combustion engine when the fuel cut control is stopped (remaining EGR gas amount) can be estimated in a known method from the amount of EGR gas present in the intake system of the internal combustion engine immediately before the fuel cut control is executed, the throttle valve opening degree during the fuel cut control, the duration of the fuel cut control, and so forth.

The first aspect of the present invention may further include an EGR gas amount control section that stops recirculation of exhaust gas by the EGR assembly when the operational state of the internal combustion engine is in a predetermined non-EGR region under a low load and at a low speed, and that recirculates EGR gas using the EGR assembly in an amount in accordance with the operational state of the internal combustion engine when the operational state of the internal combustion engine is in an EGR region under a higher load or at a higher speed than in the non-EGR region, and the prescribed amount may be set to be smaller when the operational state of the internal combustion engine immediately before the fuel cut control is executed is in the EGR region than when it is in the non-EGR region.

Here, as discussed above, in the case where the internal combustion engine is operating in the EGR region immediately before the fuel cut control is performed, the EGR assembly recirculates EGR gas. In that case, it is considered that any EGR gas is present in the intake system of the internal combustion engine when the fuel cut control is started. In the case where the internal combustion engine is operating in the non-EGR region immediately before the fuel cut control is performed, on the other hand, the EGR assembly does not recirculate EGR gas. In that case, it is considered that any EGR gas is not present in the intake system of the internal combustion engine when the fuel cut control is started.

To sum up, it is highly likely that the amount of EGR gas remaining when the fuel cut control is stopped is larger in the case where the internal combustion engine is operating in the EGR region immediately before the fuel cut control is executed than in the case where the internal combustion engine is operating in the non-EGR region. Hence, in the first aspect of the present invention, the prescribed amount is set to be smaller in the case where the internal combustion engine is operating in the EGR region immediately before the fuel cut control is performed than in the case where the internal combustion engine is operating in the non-EGR region.

Consequently, it is possible to determine whether any EGR gas remains when the fuel cut control is stopped, or if any the amount of EGR gas, according to the operational state of the internal combustion engine immediately before the fuel cut control is performed. This makes it possible by simpler control to prevent the air-fuel ratio of the intake air to be inducted into the cylinder from becoming excessively rich, and to suppress the occurrence of unstable combustion and misfires of the engine, for a predetermined period after the fuel cut control is stopped.

In the first aspect of the present invention, an amount of fuel injected by the deceleration-cancellation fuel injection control section may be set based on a learned value acquired by learning control, and the prescribed amount may be set by adjusting the learned value.

Here, the amount of fuel injected by the deceleration-cancellation fuel injection control section is obtained by learning control of an air flow meter output value in some cases. In such cases, an optimum fuel injection amount can always be obtained by modifying a learned value, even if the correlation between the command value of the fuel injection amount and the actual fuel injection amount changes because of, for example, aging of the fuel injection valve.

In the first aspect of the present invention, the prescribed amount is set utilizing the learned value by adjusting the learned value appropriately. According to this configuration, it is possible, by simply adjusting the learned value appropriately, to control the amount of fuel to be injected by the deceleration-cancellation fuel injection control section to the prescribed amount.

In the first aspect of the present invention, deceleration opening/closing control in which a throttle valve provided in the intake passage of the internal combustion engine is temporarily opened and then closed may be performed when the internal combustion engine is decelerating and the fuel cut control is started.

According to this configuration, it is possible to improve the scavenging efficiency for the EGR gas present in the intake system of the internal combustion engine when the fuel cut control is started, and reduce the amount of EGR gas present in the intake system of the internal combustion engine for a short period. Consequently, it is possible to more reliably suppress the occurrence of unstable combustion and misfires at the time when the fuel cut control is stopped. In addition, according to the first aspect of the present invention, the throttle valve is temporarily opened and then closed, and therefore the driver can obtain a sufficient deceleration feel during the subsequent deceleration state.

In the first aspect of the present invention, a valve open period of the throttle valve in the deceleration opening/closing control may be set based on the amount of EGR gas present in the intake system of the internal combustion engine when the fuel cut control is started.

In order to improve the scavenging efficiency, the valve open period of the throttle valve in the deceleration opening/closing control needs to be longer as the amount of EGR gas present in the intake system of the internal combustion engine is larger is larger, and may be shorter as the amount of such EGR gas is smaller, when the fuel cut control is started. In the first aspect of the present invention, the valve open period of the throttle valve in the deceleration opening/closing control is decided to be a value necessary and sufficient to scavenge the EGR gas present in the intake system of the internal combustion engine based on the amount of EGR gas present in the intake system of the internal combustion engine when the fuel cut control is started.

According to this configuration, it is possible to avoid the disadvantage that the EGR gas present in the intake system of the internal combustion engine cannot be scavenged sufficiently because the valve open period of the throttle valve is so short and the disadvantage that the deceleration feel is diminished because the valve open period of the throttle valve is unnecessarily long.

In the first aspect of the present invention, a valve open period of the throttle valve in the deceleration opening/closing control may be equal to or shorter than a predetermined normal deceleration feel maintaining time, which does not make a driver feel that deceleration is delayed, and throttle valve may be closed initially at the same rate as it is opened and then at a gradually reduced rate.

Here, if the time since the throttle valve is opened until it is closed in the deceleration opening/closing control is long, the driver may have a deceleration feel at a delayed timing and thus a sense of discomfort. Thus, in the first aspect of the present invention, the time since the throttle valve is opened until it is closed is made so short that the driver will not feel that deceleration is delayed, and the throttle valve is closed at such a rate that is initially as high as possible and then reduces gradually.

According to this configuration, it is possible to give the driver a deceleration feel with a minimum delay while maintaining the total scavenging efficiency. In addition, torque variations due to an abrupt increase in negative pressure in the intake system can be suppressed. The normal deceleration feel maintaining time may be obtained in advance by an experiment or the like. In the configuration described above, the rate at which the throttle valve is opened may be the highest rate at which the throttle valve can be opened in consideration of the scavenging efficiency.

A second aspect of the present invention is directed to a control method for an internal combustion engine including an EGR assembly that has an EGR passage to communicate an exhaust passage and an intake passage of the internal combustion engine and an EGR valve to control an amount of exhaust gas to pass through the EGR passage, and that recirculates a portion of exhaust gas to pass through the exhaust passage to the intake passage as EGR gas. The control method includes: executing fuel cut control, in which fuel injection in the internal combustion engine is stopped, when the internal combustion engine is decelerating; and when the internal combustion engine stops decelerating and the fuel cut control is stopped injecting a prescribed amount of fuel for a predetermined period after the fuel cut control is stopped such that the prescribed amount when an amount of EGR gas present in an intake system of the internal combustion engine is larger is equal to or smaller than that when the amount of such EGR gas is smaller.

The configurations in accordance with the aspects of the present invention can be used in combination if at all possible.

According to the aspects of the present invention, it is possible to provide a sufficient deceleration feel when fuel cut control is started with EGR gas present in an intake system of an internal combustion engine, and suppress unstable combustion such as misfires when the fuel cut control is stopped to resume normal operation.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
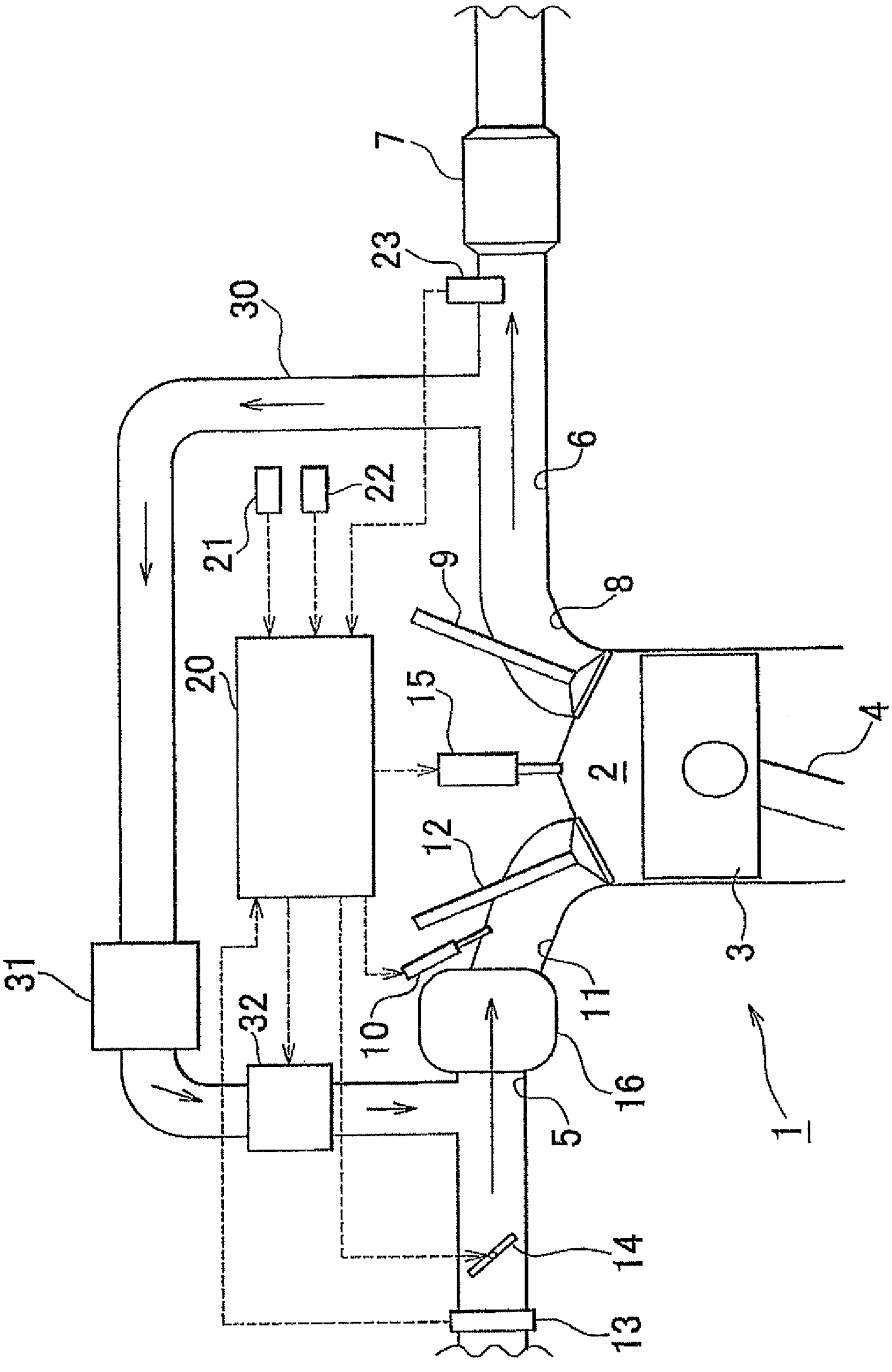
FIG. 1 is a diagram that shows the schematic configuration of an internal combustion engine and its intake, exhaust, and control systems in accordance with an embodiment of the present invention.

FIG. 1 is a diagram that shows the schematic configuration of an internal combustion engine 1 and its intake, exhaust, and control systems in accordance with a first embodiment of the invention. It should be noted that the schematic configuration of the internal combustion engine and its intake, exhaust, and control systems are the same in all the embodiments below. As shown in FIG. 1, the internal combustion engine 1 outputs power by repeating four cycles, namely intake stroke, compression stroke, explosion stroke (expansion stroke), and exhaust stroke. The internal combustion engine 1 has formed therein a cylinder (combustion chamber) 2. A force generated by the combustion of fuel in the cylinder 2 is converted, via a piston 3 and a connecting rod 4, into a rotational force of a crankshaft (not shown). The cylinder 2 is provided with an intake port 11, which is the most downstream portion of an intake passage 5, and an exhaust port 8, which is the most upstream portion of an exhaust passage 8. The boundary between the intake port 11 and the cylinder 2 is opened and closed by an intake valve 12. The boundary between the exhaust port 8 and the cylinder 2 is opened and closed by an exhaust valve 9.

The internal combustion engine 1 includes a fuel injection valve 10. The fuel injection valve 10 is an electromagnetically driven valve that injects fuel, which has been pressurized by a high-pressure pump (not shown) or the like, into the intake port 11 in an appropriate amount and at an appropriate timing. In the cylinder 2, an ignition plug 15 is provided that ignites a mixture of fuel injected from the fuel injection valve 10 and fresh air inducted into the cylinder 2 (air-fuel mixture).

In the exhaust passage 6 are provided an air-fuel ratio sensor 23 that detects the air-fuel ratio of exhaust gas when it is activated, and an exhaust purification device 7 that purifies the exhaust gas by removing nitrogen oxides (NOx), hydrocarbons (HC), carbon monoxide (CO), particulate matter (PM), and so forth contained therein. A throttle valve 14 that can control the amount of intake air is provided in the intake passage 5. The intake passage 5 is also provided with an air flow meter 13 that detects the amount of intake air that is inducted (intake air amount), and a surge tank 16 that eliminates pulsation of the intake air.

The internal combustion engine 1 is also provided with an exhaust gas recirculation (EGR) passage 30 that communicates the intake passage 5 and the exhaust passage 6. The EGR passage 30 recirculates a portion of exhaust gas to the intake passage 5 as appropriate. The EGR passage 30 is provided with an EGR cooler 31 and an EGR valve 32, disposed in the stated order in the direction in which gas (EGR gas) flows in the EGR passage 30 (as indicated by the arrows in FIG. 1).

The EGR cooler 31 surrounds the FUR passage 30 and cools the EGR gas. The EGR valve 32 is an electronically, controlled valve that is continuously actuated to adjust the flow rate of the EGR gas. The EGR passage 30 and the EGR valve 32 of this embodiment serve as the "EGR assembly" of the present invention.

In addition to the air-fuel ratio sensor 23 and the air flow meter 13, the internal combustion engine 1 includes a crank position sensor 21 that detects the rotational speed of the internal combustion engine 1 and an accelerator position sensor 22, which allow the operational state of the internal combustion engine 1 to be determined. Signals from these sensors are input to an electronic control unit (ECU) 20.

The ECU 20 includes a logic circuit that has a central processing unit (CPU), a read only memory (ROM), a random access memory (RAM), a backup RAM, and so forth, and controls various components of the internal combustion engine 1 based the input from various sensors.

Figure 2:
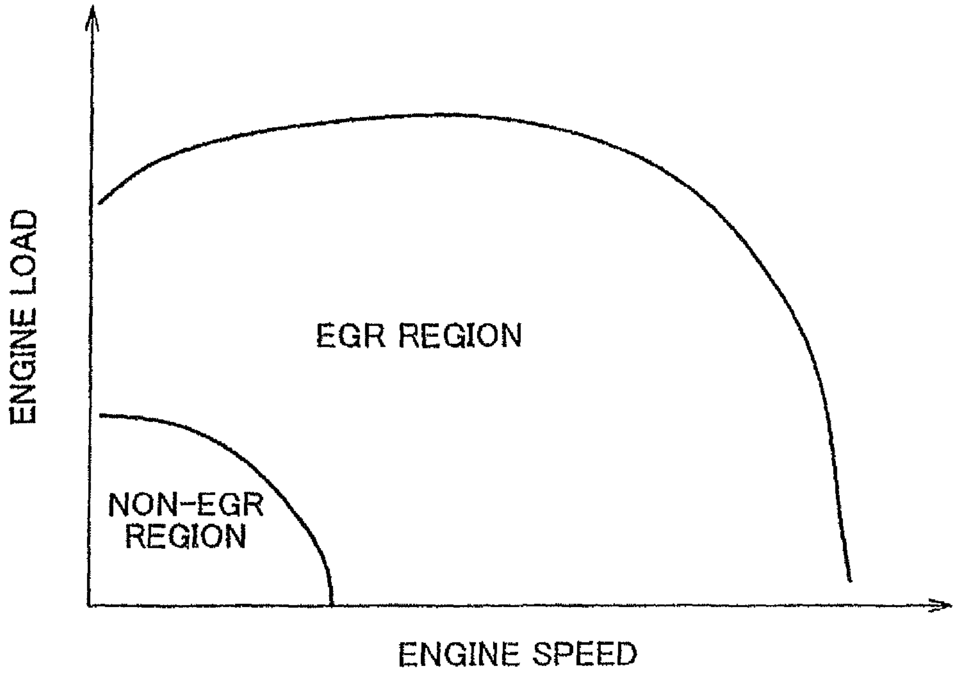
FIG. 2 is a chart that illustrates an EGR region and a non-EGR region in accordance with the embodiment of the present invention.

Whether EGR is performed is determined depending on the operational state of the internal combustion engine 1. For example, if the internal combustion engine 1 is operating under a low load and at a low speed, the amount of fresh air and fuel inducted into the cylinder 2 is so small that induction of EGR gas would easily destabilize combustion. In contrast, if the internal combustion engine 1 is operating under a high load or at a high speed, combustion is so stable that a large amount of EGR gas may be inducted. For these reasons, the operational state of the internal combustion engine 1 is divided into an EGR region, in which execution of EGR is permitted, and a non-EGR region, in which execution of EGR is prohibited. FIG. 2 shows the EGR region and the non-EGR region by way of example. The ECU 20 controls the amount of EGR gas depending on whether the internal combustion engine 1 is operating in the EGR region or the non-EGR region, and according to the operational state of the internal combustion engine 1 in the case where the internal combustion engine 1 is operating in the EGR region. In this respect, the ECU 20 serves as the "EGR gas amount control section" of the present invention.

Now, it is assumed that the internal combustion engine 1 is brought into the deceleration state and fuel cut control is executed while EGR is performed. It should be noted that the fuel cut control is executed by the ECU 20, which serves as the "fuel cut control section" of the present invention. In this case, EGR gas is present in a portion downstream of the connection between the EGR passage 30 and the intake passage 5, the intake port 11, and the surge tank 16 when the fuel cut control is started. When the fuel cut control is executed, fuel injection from the fuel injection valve 10 is stopped and the EGR valve 32 and the throttle valve 14 are closed. In this case, EGR gas may be present in a portion of the intake passage 5 downstream of the throttle valve 14 and a portion of the EGR passage 30 downstream of the EGR valve 32 (hereinafter, these portions in which EGR gas can be present are collectively referred to as "EGR gas retention area"). The EGR gas present in the EGR gas retention area of this embodiment may be also referred to as EGR gas present in the intake system.

In this way, the EGR gas present in the EGR gas retention area is gradually scavenged during execution of the fuel cut control. However, some of the EGR gas is not scavenged but remains in many cases. Then, a large amount of EGR gas may still be present when the internal combustion engine 1 stops decelerating and the fuel cut control is stopped. Consequently, the amount of EGR gas inducted into the cylinder may exceed the limit set in accordance with the operational state of the internal combustion engine 1, thereby causing the engine to misfire.

Figure 3:
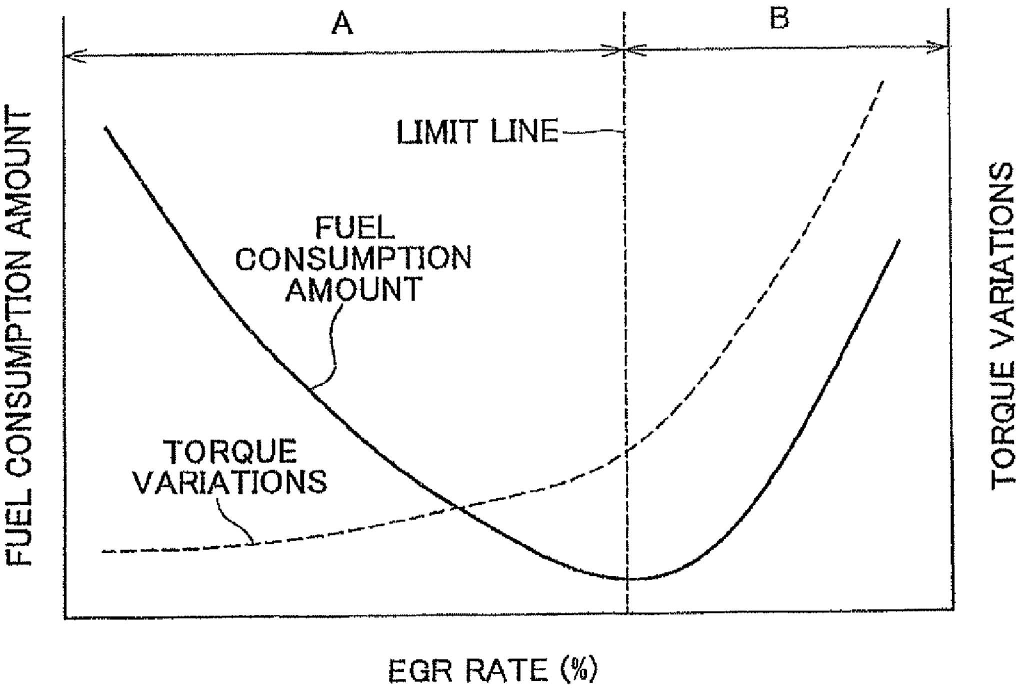
FIG. 3 is a chart that illustrates the limit of EGR gas in accordance with the embodiment of the present invention.

The limit of EGR gas is described with reference to FIG. 3. In FIG. 3, the horizontal axis represents the EGR rate, and the vertical axis represents the fuel economy and torque variations. As the EGR rate increases in certain operational states, the heat capacity of the intake air increases because of inert gas in the EGR gas, which reduces the combustion temperature and thus reduces the cooling loss. In addition, the torque decreases as the amount of EGR gas increases, which increases the opening degree of the throttle valve 14 and reduces the pump loss. As a result, the EGR rate increases and the fuel economy improves (the fuel consumption amount reduces) in the region A.

As the EGR rate further increases, the ratio of inert gas increases and thus the combustion deteriorates. Therefore, the fuel economy deteriorates (the fuel consumption amount increases) and variations in torque, output abruptly increase because of occurrence of misfires in the region B. In this embodiment of the present invention, the limit of EGR is set to a point at which stable combustion is maintained and the fuel economy may be maximized by execution of EGR (the boundary between the regions A and B).

Figure 4:
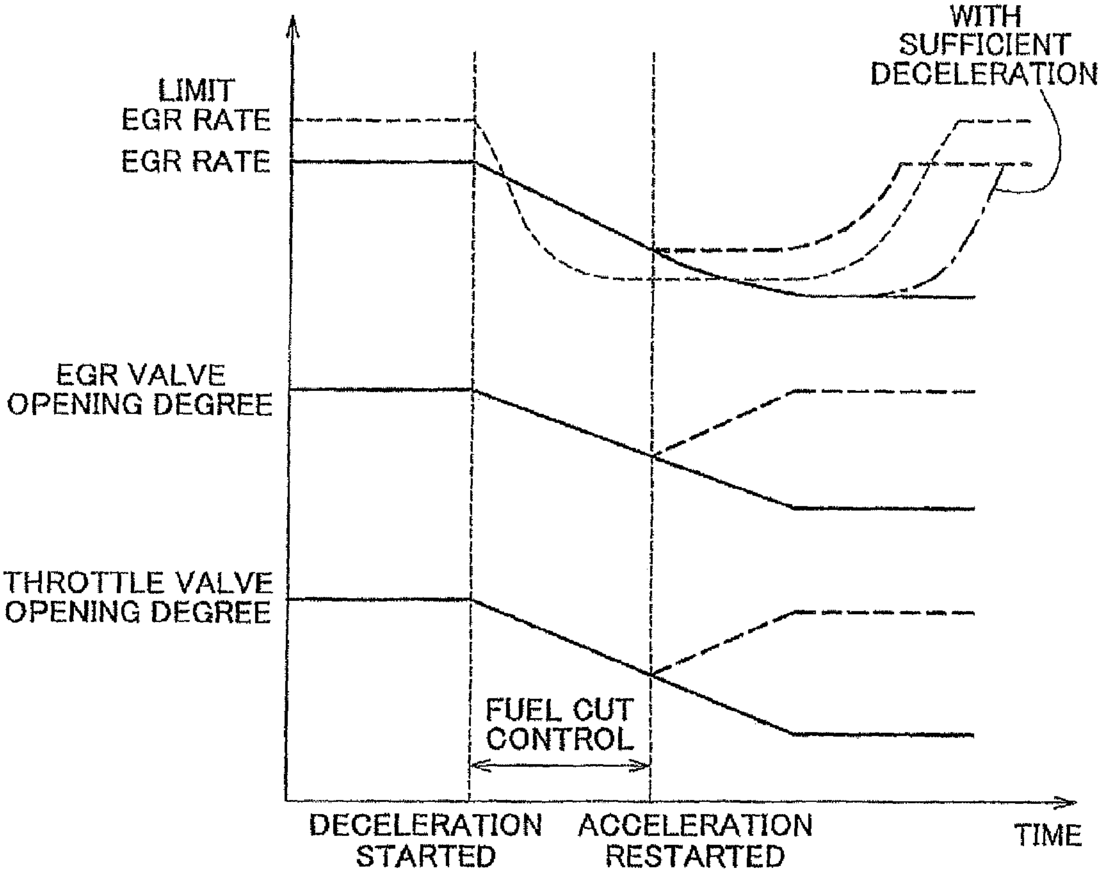
FIG. 4 is a chart that shows changes in EGR rate and limit EGR rate of intake air to be inducted into a cylinder before and after fuel cut control in accordance with the embodiment of the present invention.

Next, with reference to FIG. 4, changes in EGR rate and EGR limit of intake air that is inducted into the cylinder 2 before and after fuel cut control will be described. In the graph of FIG. 4, the horizontal axis represents the time, and the vertical axis represents the EGR rate and the limit EGR rate, the opening degree of the EGR valve 32, and the opening degree of the throttle valve 14. In the graph of FIG. 4, the limit discussed above is represented as the limit EGR rate.

As shown in FIG. 4, the limit EGR rate is maintained higher than the actual EGR rate before fuel cut control is started, so that there will the occurrence of unstable combustion is minimized. After the fuel cut control is started, the opening degree of the throttle valve 14 and the opening degree of the EGR valve 32 are reduced. At the same time, the limit EGR rate and the actual EGR rate decrease.

The limit EGR rate decreases so sharply compared to the actual EGR rate that the magnitude relationship between the limit EGR rate and the actual EGR rate is reversed after deceleration starts. If acceleration is restarted after the internal combustion engine 1 has sufficiently decelerated, the actual EGR rate becomes lower than the limit EGR rate again as indicated by the dot and dash line in FIG. 4. Therefore, the occurrence of unstable combustion is minimized when the fuel cut control is stopped and acceleration is restarted.

If acceleration is restarted before sufficient deceleration, on the other hand, the fuel cut control stops with the actual EGR rate still higher than the limit EGR rate as indicated by the thick broken line in FIG. 4. Therefore, unstable combustion may occur.

In general, when the internal combustion engine 1 stops decelerating and the fuel cut control is stopped, the air-fuel ratio sensor 23 has been cooled and has lost its activity. In this case, feedback control of the fuel injection amount based on the output of the air-fuel ratio sensor 23 is occasionally difficult. In order to overcome this drawback, conventionally, an amount of fuel anticipated based on the output signal of the air flow meter 13 (hereinafter referred to as "deceleration-cancellation fuel injection amount") is injected from the fuel injection valve 10 over a predetermined period after the fuel cut control is stopped. The deceleration-cancellation fuel injection, amount of this embodiment is equivalent to the "prescribed amount" of the present invention. The deceleration-cancellation fuel injection amount is injected based on a command of the ECU 20. In this respect, the ECU 20 of this embodiment serves as the "deceleration-cancellation fuel injection control section" of the present invention.

Here, because EGR gas is present in the EGR gas retention area, a mixture of fresh air and the remaining EGR gas is inducted into the cylinder 2 when the fuel cut control is stopped and the throttle valve 14 is opened. In contrast, the deceleration-cancellation fuel injection amount, which is based on the output signal of the air flow meter 13, is determined on the assumption that the intake air inducted into the cylinder 2 does not contain any EGR gas. As a result, the air-fuel mixture may be excessively rich and cause the engine to misfire.

Figure 5:
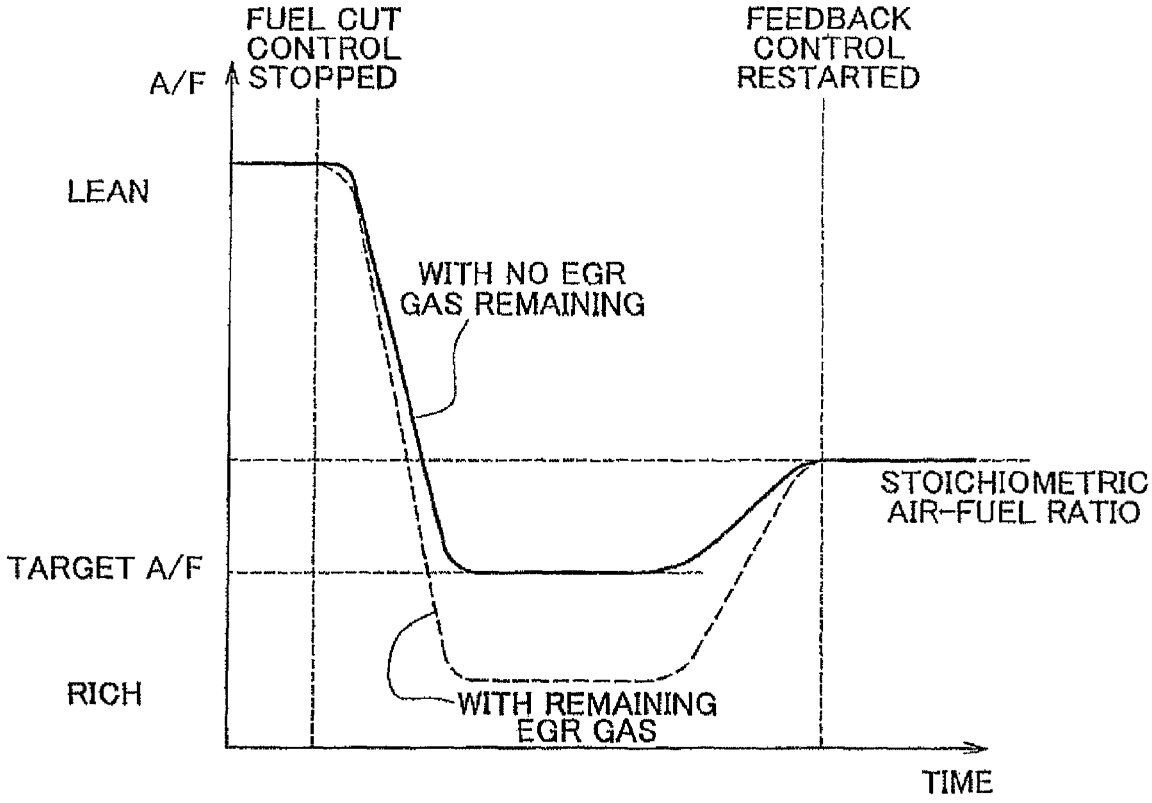
FIG. 5 is a chart that shows changes in air-fuel ratio after the fuel cut control is stopped in accordance with the embodiment of the present invention.

FIG. 5 shows changes in air-fuel ratio after the fuel cut control is stopped. In FIG. 5, the horizontal axis represents the time, and the vertical axis represents the air-fuel ratio. In FIG. 5, the solid curve corresponds to the case where the internal combustion engine 1 is operating in the non-EGR region before the fuel cut control is started and thus no EGR gas remains in the EGR gas retention area. The broken curve corresponds to the case where the internal combustion engine 1 is operating in the EGR region before the fuel cut control is started and thus some EGR gas remains in the EGR gas retention area.

The leftmost portion of the graph corresponds to the region where the fuel cut control is ongoing. In this region, fuel is not injected and thus the air-fuel ratio is lean, regardless of whether any EGR gas remains in the EGR gas retention area.

When the fuel cut control is stopped, the deceleration-cancellation fuel injection amount, which is determined in accordance with the output of the air flow meter 13, is injected from the fuel injection valve 10 until the air-fuel ratio sensor 23 is activated and feedback control of the fuel injection amount is restarted.

In this event, if no EGR gas remains in the EGR gas retention area, the target air-fuel ratio (A/F) is set to be richer than the stoichiometric air-fuel ratio to raise the temperature of the catalyst on the downstream side. In contrast, if some EGR gas remains in the EGR gas retention area, injecting the same amount of fuel as in the case with no EGR gas remaining from the fuel injection valve 10 would reduce the amount of air that is inducted into the cylinder 2 by the amount of the remaining EGR gas, which would make the air-fuel ratio further richer than the target A/F. In this state, the excessively rich air-fuel ratio might destabilize combustion.

In this embodiment, in contrast, the deceleration-cancellation fuel injection amount is varied depending on whether EGR gas is inducted into the cylinder, in other words depending on whether the internal combustion engine 1 is operating in the EGR region or the non-EGR region, before the internal combustion engine 1 begins decelerating and the fuel cut control is started. In this embodiment, the period since the fuel cut control is stopped until the feedback control is restarted as shown in FIG. 5 corresponds to the "predetermined period" of the present invention.

Figure 6:
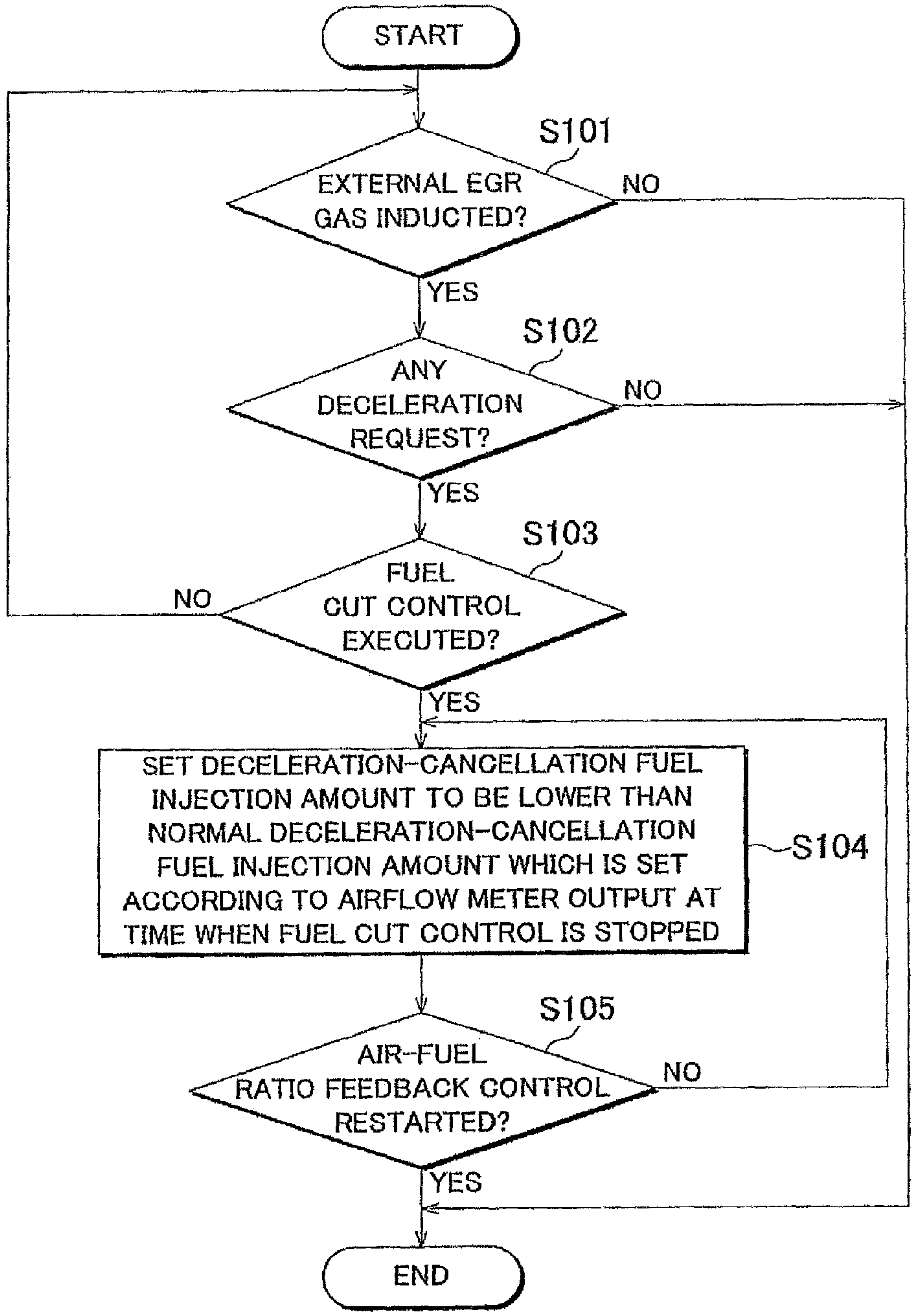
FIG. 6 is a flowchart that shows a deceleration-cancellation fuel injection amount setting routine 1 in accordance with the first embodiment of the present invention.

FIG. 6 is a flowchart that shows a deceleration-cancellation fuel injection amount setting routine 1 in accordance with this embodiment. This routine is a program stored in the ROM of the ECU 20 and executed at specified intervals during operation of the internal combustion engine 1.

When this routine is started, first in step S101, it is determined whether external EGR gas is inducted. Specifically, the operational state of the internal combustion engine 1 is acquired based on signals received from the crank position sensor 21 and the accelerator position sensor 22, and the determination is made depending on whether the internal combustion engine 1 is operating in the EGR region or the non-EGR region. If it is determined that no external EGR gas is inducted, no EGR gas will be inducted into the cylinder 2 when the internal combustion engine 1 stops decelerating either, and therefore the routine ends. If it is determined that external EGR gas is inducted, on the other hand, EGR gas remains in at least the EGR gas retention area, and therefore the routine proceeds to step S102.

In step S102, it is determined whether there is any deceleration request. Specifically, a deceleration request may be determined to be present when based on signals received from the accelerator position sensor 22 that the driver has released the accelerator pedal. If it is determined that there is no deceleration request, the routine ends. If it is determined that there is a deceleration request, on the other hand, the routine proceeds to step S103.

In step S103, it is determined whether a fuel cut control is executed. Specifically, the determination may be made according to a drive signal from the ECU 20 to the fuel injection valve 10, or by reading the value of a fuel cut flag that is turned on when fuel cut control is started. If it is determined that the fuel cut control is not executed, the routine returns to the process of step S101. If it is determined that the fuel cut control is being executed, on the other hand, the routine proceeds to step S104.

In step S104, the deceleration-cancellation fuel injection amount, which is set at the time when the fuel cut control is stopped when the internal combustion engine 1 is brought out of the deceleration state to resume normal operation, is set lower than a normal deceleration-cancellation fuel injection amount, which is set according to the output of the air flow meter 13 at the time when the fuel cut control is stopped when the internal combustion engine 1 is brought out of the deceleration state to resume normal operation, (in the case where no external EGR gas is inducted) by a prescribed amount. That is, the normal deceleration-cancellation fuel injection amount is read from a map according to the air flow meter output when normal fuel cut control is stopped. Then, the value that is smaller than the normal deceleration-cancellation fuel injection amount is set as the actual fuel injection amount. When the process of step S104 is finished, the routine proceeds to step S105.

In step S105, it is determined whether air-fuel ratio feedback control has been restarted. If the air-fuel ratio feedback control is restarted, the deceleration-cancellation fuel injection amount is not injected. Therefore, if it is determined that the air-fuel ratio feedback control has been restarted, the routine ends. If it is determined that the air-fuel ratio feedback control has not been restarted, however, the routine returns to the process of step S104. The processes of step S104 and step S105 continue to be executed until it is determined in step S105 that the air-fuel ratio feedback control is restarted.

That is, with the continuous execution of the processes of step S104 and step S105, the value that is smaller than the normal deceleration-cancellation fuel injection amount by the specified amount is set as the deceleration-cancellation fuel injection amount. Then, if the fuel cut control is stopped during this period, the fuel injection valve 10 injects fuel in the amount that is smaller than the normal deceleration-cancellation fuel injection amount by the specified amount. It should be noted that if step S104 is executed repeatedly, the deceleration-cancellation fuel injection amount is obtained by subtracting the specified amount from the normal deceleration-cancellation fuel injection amount which is in accordance with the air flow meter output at each execution of step S104, and not by subtracting from the deceleration-cancellation fuel injection amount the specified amount accumulatively at each execution of step S104.

In this embodiment, the deceleration-cancellation fuel injection amount, which is the amount of fuel to be injected during the period since the fuel cut control is stopped until the air-fuel ratio feedback control is restarted, is reduced by the specified amount if external EGR gas is inducted before the internal combustion engine 1 begins decelerating and the fuel cut control is started. According to this configuration, it is possible to prevent the air-fuel ratio from becoming excessively rich and suppress the occurrence of unstable combustion, because of any EGR gas remaining in the EGR gas retention area of the internal combustion engine 1, when the fuel cut control is canceled. The specified amount may be a constant value that is empirically determined.

In this embodiment, also, whether external EGR gas is inducted into the internal combustion engine 1 is determined depending on whether the internal combustion engine 1 is operating in the EGR region or the non-EGR region before the fuel cut control is started. According to this configuration, whether external EGR gas is inducted into the internal combustion engine 1 may be determined more simply and reliably.

Next, a second embodiment of the present invention is described. In this embodiment, the fuel injection amount is set through a learning control, and the learned value obtained in the learning control is utilized to set the deceleration-cancellation fuel injection amount.

Figure 7:
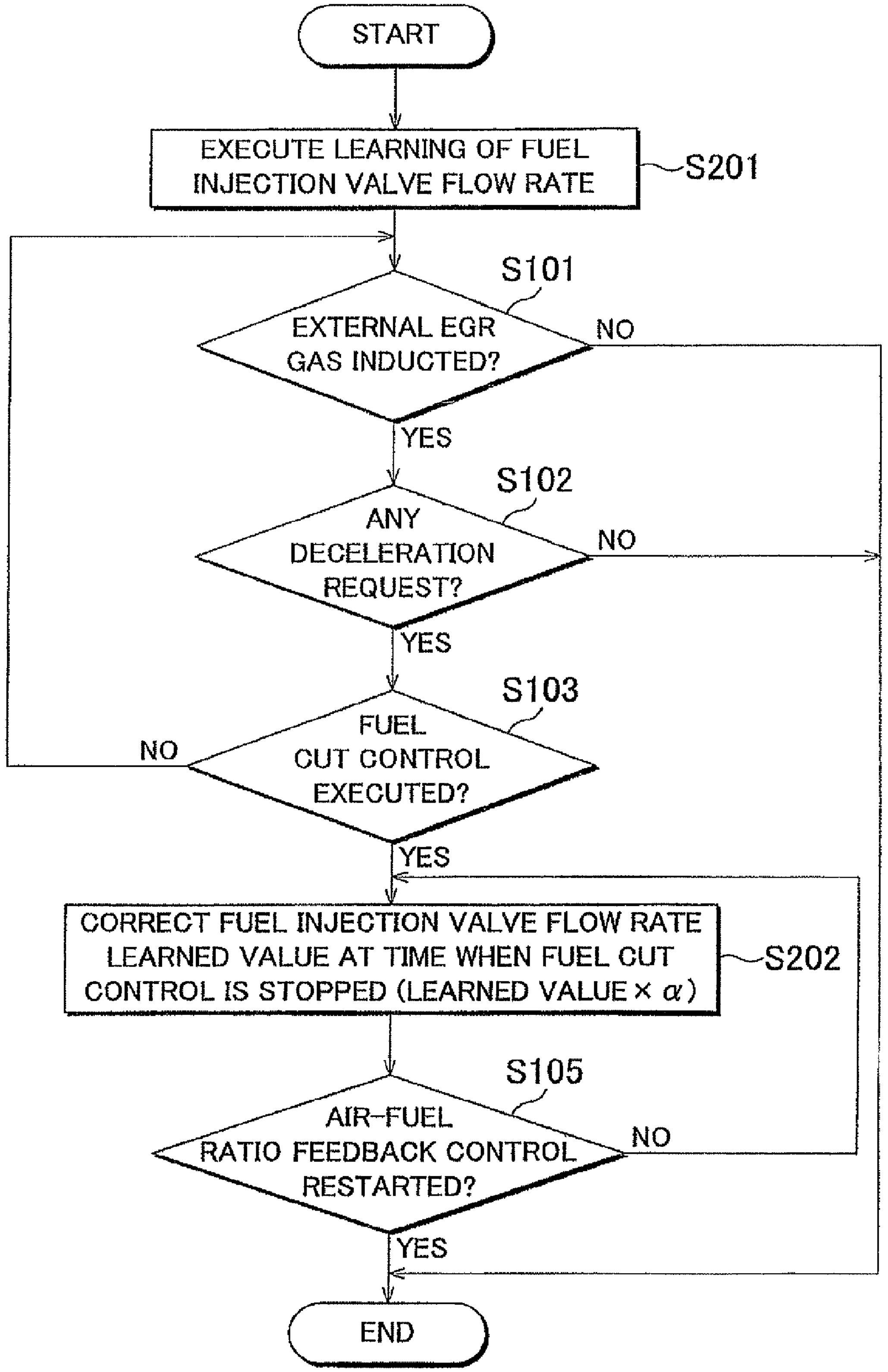
FIG. 7 is a flowchart that shows a deceleration-cancellation fuel injection amount setting routine 2 in accordance with a second embodiment of the present invention.

FIG. 7 shows a flowchart of a deceleration-cancellation fuel injection amount setting routine 2 in accordance with the second embodiment. The routine is a program stored in the ROM of the ECU 20 and executed specified intervals during operation of the internal combustion engine 1. The routine differs from the deceleration-cancellation fuel injection amount setting routine in the first embodiment in that the process of step S201 is executed before the process of step S101 and the process of step S202 is executed in place of the process of step S104. Hereinafter, only the differences of the deceleration-cancellation fuel injection amount setting routine 2 from the deceleration-cancellation fuel injection amount setting routine 1 will be described.

When this routine is started, first in step S201, the flow rate of the fuel injection valve is learned. In some cases, the relationship between the target fuel injection amount, which is given by the ECU 20 to the fuel injection valve 10, and the actual fuel injection amount changes because of, for example, aging or soil of the fuel injection valve 10. In such cases, the deviation of the actual fuel injection amount from the target fuel injection amount is estimated from the relationship between the exhaust gas-fuel ratio obtained on the assumption that fuel is injected actually in the amount in accordance with the command value and the actual exhaust gas-fuel ratio. A learned value that corrects such deviation is then calculated. The learned value may be used as a coefficient of the deceleration-cancellation fuel injection amount. When the process of step S201 is finished, the routine proceeds to step S101.

The processes of step S101 to step S103 are equivalent to those of the deceleration-cancellation fuel injection amount setting routine described in relation to the first embodiment and thus are not described here. When the process of step S103 ends, the routine proceeds to step S202.

In step S202, the fuel injection valve flow rate learned value when the fuel cut control is stopped is multiplied by a value α (α<1) to correct the learned value itself, which results in the deceleration-cancellation fuel injection amount being reduced by a specified amount. When the process of step S202 ends, the routine proceeds to step S105. The process of step S105 is equivalent to that of the deceleration-cancellation fuel injection amount setting routine and thus is not described here.

In this embodiment, if external EGR gas is inducted into the internal combustion engine before the fuel cut control is started, the fuel injection valve flow rate learned value is corrected to reduce the deceleration-cancellation fuel injection amount by a specified amount. According to this configuration, it is possible, by simply correcting the learned value obtained in the learning control, to prevent the air-fuel ratio from becoming excessively rich after the fuel cut control is stopped because of EGR gas remaining in the EGR gas retention area when the fuel cut control is started. As a result, unstable combustion may be suppressed.

Figure 8:
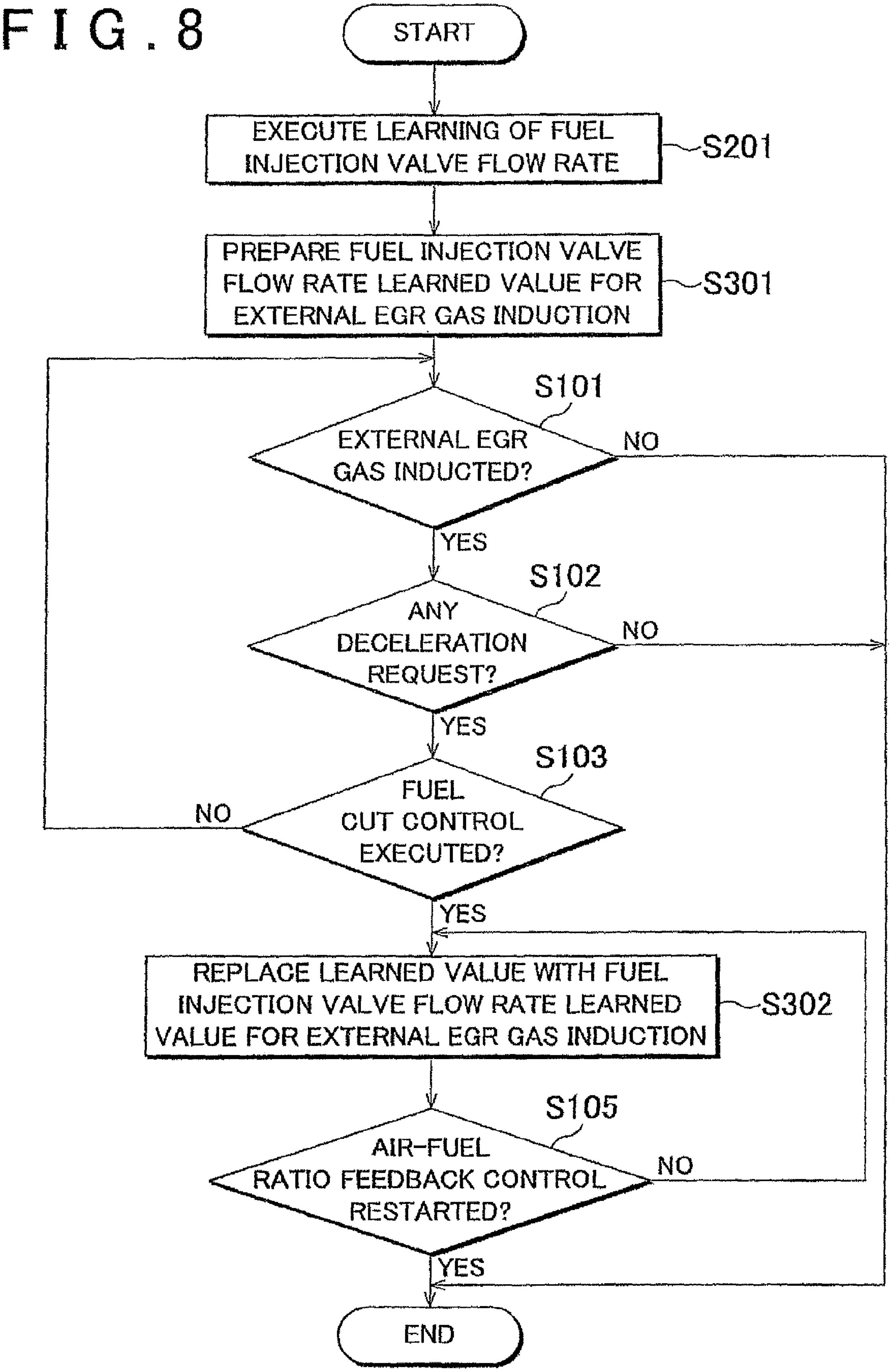
FIG. 8 is a flowchart that shows a deceleration-cancellation fuel injection amount setting routine 3 in accordance with the second embodiment of the present invention.

The control in accordance with this embodiment may be modified as described below. FIG. 8 shows a flowchart of a deceleration-cancellation fuel injection amount setting routine 3 in accordance with this embodiment. This routine is different from the deceleration-cancellation fuel injection amount setting routine 2 discussed above that the process of step S301 is added after step S201 and the process of step S202 is replaced with the process of step S302. Hereinafter, a description is made of only the differences of this routine from the deceleration-cancellation fuel injection amount setting routine 2.

In the process of step S301, a fuel injection valve flow rate learned value for external EGR gas induction is set additionally, besides the previous fuel injection valve flow rate learned value. Specifically, the additional value may be prepared by subtracting a specified amount from the learned value obtained in the learning of the fuel injection valve flow rate of step S201, or multiplying the obtained learned value by α (α<1). When the process of step S301 is finished, the routine proceeds to step S101.

In step S302 of this routine, the learned value used to set the deceleration-cancellation fuel injection amount switches from the previous fuel injection valve flow rate learned value to the fuel injection valve flow rate learned value for external EGR gas induction set in step S301. When the process of step S302 is finished, the routine proceeds to step S105.

In this embodiment, learning control of the flow rate of the fuel injection valve 10 is executed as in the deceleration-cancellation fuel injection amount setting routine 2 In this embodiment, the fuel injection valve flow rate learned value is not corrected but a fuel injection valve flow rate learned value for external EGR gas induction is always prepared, so that the learned value used to set the deceleration-cancellation fuel injection amount is switched to the fuel injection valve flow rate learned value for external EGR gas induction if it is determined in step S101 that external EGR gas is inducted.

According to this configuration, it is possible, by simply preparing two types of learned values in the learning control and switching which learned value to use, to prevent the air-fuel ratio from becoming excessively rich after the fuel cut control is stopped because of EGR gas remaining in the EGR gas retention area when the fuel cut control is started. As a result, unstable combustion can be suppressed.

Next, a third embodiment of the present invention is described. In this embodiment, if external EGR gas is inducted into the internal combustion engine 1 before the fuel cut control is started, the amount of EGR gas remaining in the EGR gas retention area is estimated to set the deceleration-cancellation fuel injection amount according to the estimated value.

Figure 9:
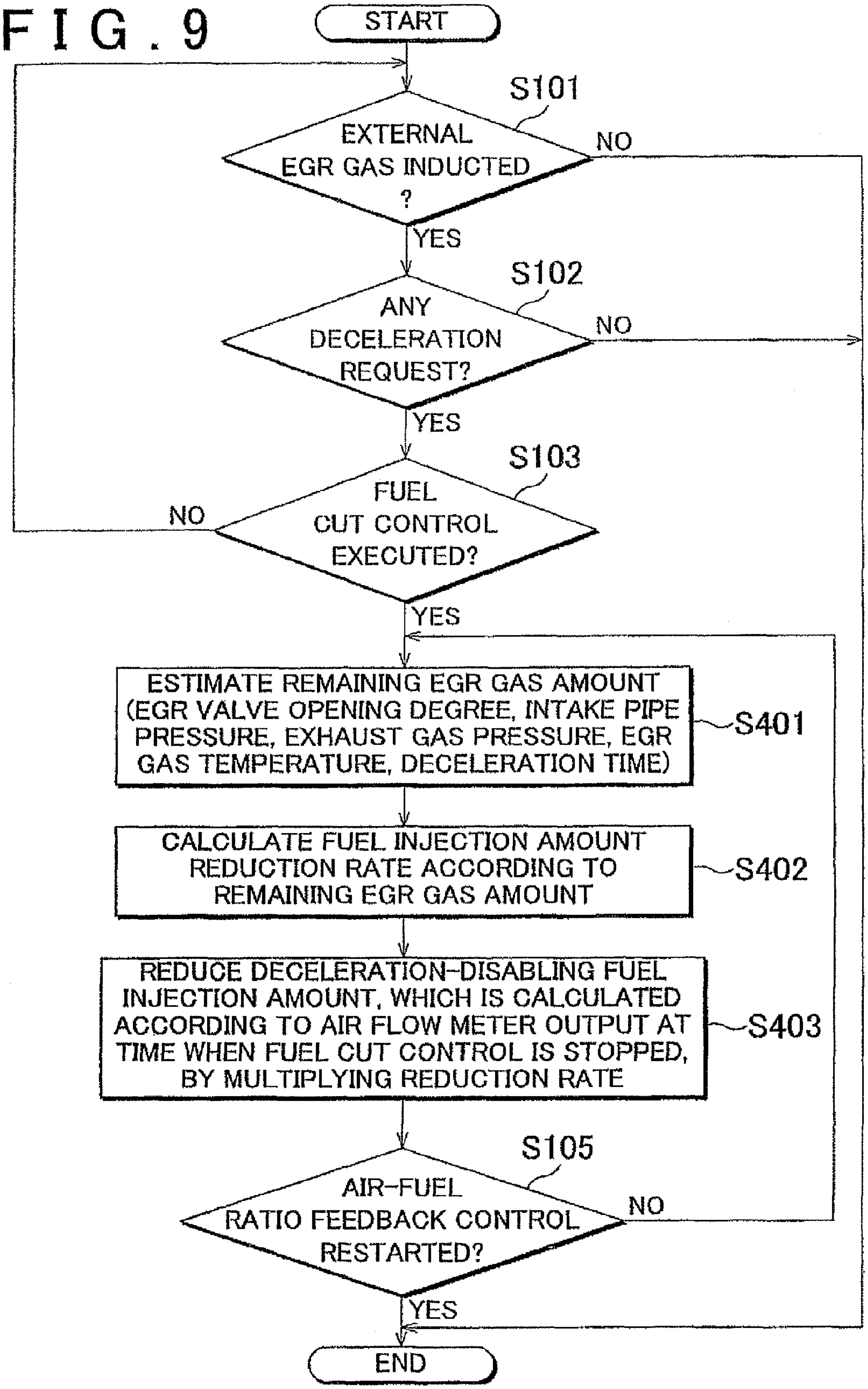
FIG. 9 is a flowchart that shows a deceleration-cancellation fuel injection amount setting routine 4 in accordance with a third embodiment of the present invention.

FIG. 9 shows a flowchart of a deceleration-cancellation fuel injection amount setting routine 4 in accordance with the third embodiment. This routine differs from the deceleration-cancellation fuel injection amount setting routine described in the first embodiment in that the processes of step S401 to step S403 are executed in place of the process of step S104. Hereinafter, a description only the differences of this routine from the deceleration-cancellation fuel injection amount setting routine will be described.

In step S401 of this routine, the amount of EGR gas remaining in the EGR gas retention area (hereinafter occasionally referred to as "remaining EGR gas amount") is estimated from data such as the opening degree of the EGR valve 32, pressure of the intake passage 5, exhaust pressure, EGR gas temperature, and the duration of deceleration. Specifically, the relationship between the values of the respective data and the remaining EGR gas amount may be determined empirically and organized into a map, and the remaining EGR gas amount corresponding to the actual values of the respective data may be read from the map. Alternatively, the remaining EGR gas amount may be calculated using a known model based on the values of the respective data. When the process of step S401 is finished, the routine proceeds to step S402.

In step S402, the reduction rate of the fuel injection amount is calculated according to the remaining EGR gas amount estimated in step S401. Specifically, the relationship between the remaining EGR gas amount and the deceleration-cancellation fuel injection amount desirable to suppress unstable combustion may be determined empirically, combinations of the remaining EGR gas amount and the reduction rate to obtain the desirable deceleration-cancellation fuel injection amount may be organized into a map, and the reduction rate in accordance with the remaining EGR gas amount estimated in step S401 may be read from the map. When the process of step S402 is finished, the routine proceeds to step S403.

In step S403, the fuel injection amount is reduced by multiplying the deceleration-cancellation fuel injection amount, calculated for the air flow meter output when the fuel cut control is stopped, by the reduction rate calculated in step S402. When the process of step S403 ends, the routine proceeds to step S105. The process of step S105 is equivalent to that of the deceleration-cancellation fuel injection amount setting routine and thus is not described here.

In this embodiment, the amount of EGR gas remaining in the EGR gas retention area is derived to calculate the reduction rate of the fuel injection amount based on the remaining EGR gas amount. Then, the deceleration-cancellation fuel injection amount when the fuel cut control is stopped is multiplied by the reduction rate to be reduced.

According to this configuration, the deceleration-cancellation fuel injection amount is controlled to more precisely obtain the optimum value. Thus, unstable combustion may be suppressed more reliably after the fuel cut control is stopped.

In step S402 and step S403 of this embodiment, the reduction rate of the fuel injection amount is calculated, and the previous deceleration-cancellation fuel injection amount is multiplied thereby. It should be understood, however, that the reduction rate of the fuel injection amount calculated in step S402 may be subtracted from the previous deceleration-cancellation fuel injection amount in step S403.

In step S401 of this embodiment, the remaining EGR gas amount may be estimated based on the operational state of the internal combustion engine 1 before the fuel cut control is executed. This is because the amount of EGR gas is determined based on the operational state of the internal combustion engine 1 as discussed above.

Next, a fourth embodiment of the present invention is described. In this embodiment, the throttle valve opening degree is increased and decreased when the fuel cut control is started while the engine is decelerating as well as the control described in relation to any of first to third embodiments is executed.

Here, as shown in FIG. 4, when the internal combustion engine 1 begins decelerating and the fuel cut control is started, both the limit EGR rate and the actual EGR rate decrease. Then, before the EGR rate reaches the lowest EGR rate, the limit EGR rate falls below the actual EGR rate. If acceleration is restarted and the fuel cut control is stopped in this state, combustion is performed with an actual EGR gas amount that is larger than the limit EGR rate, which causes unstable combustion. Thus, such misfires and unstable combustion can be suppressed more reliably by improving the scavenging state when the fuel cut control is started.

So, in this embodiment, the throttle valve 14 is temporarily fully opened to improve the scavenging efficiency for the intake system of the internal combustion engine 1, and closed once the actual EGR rate is sufficiently lowered, when the fuel cut control is started in the deceleration state as well as the control described in relation to any of Embodiments 1 to 3 is executed.

Figure 10:
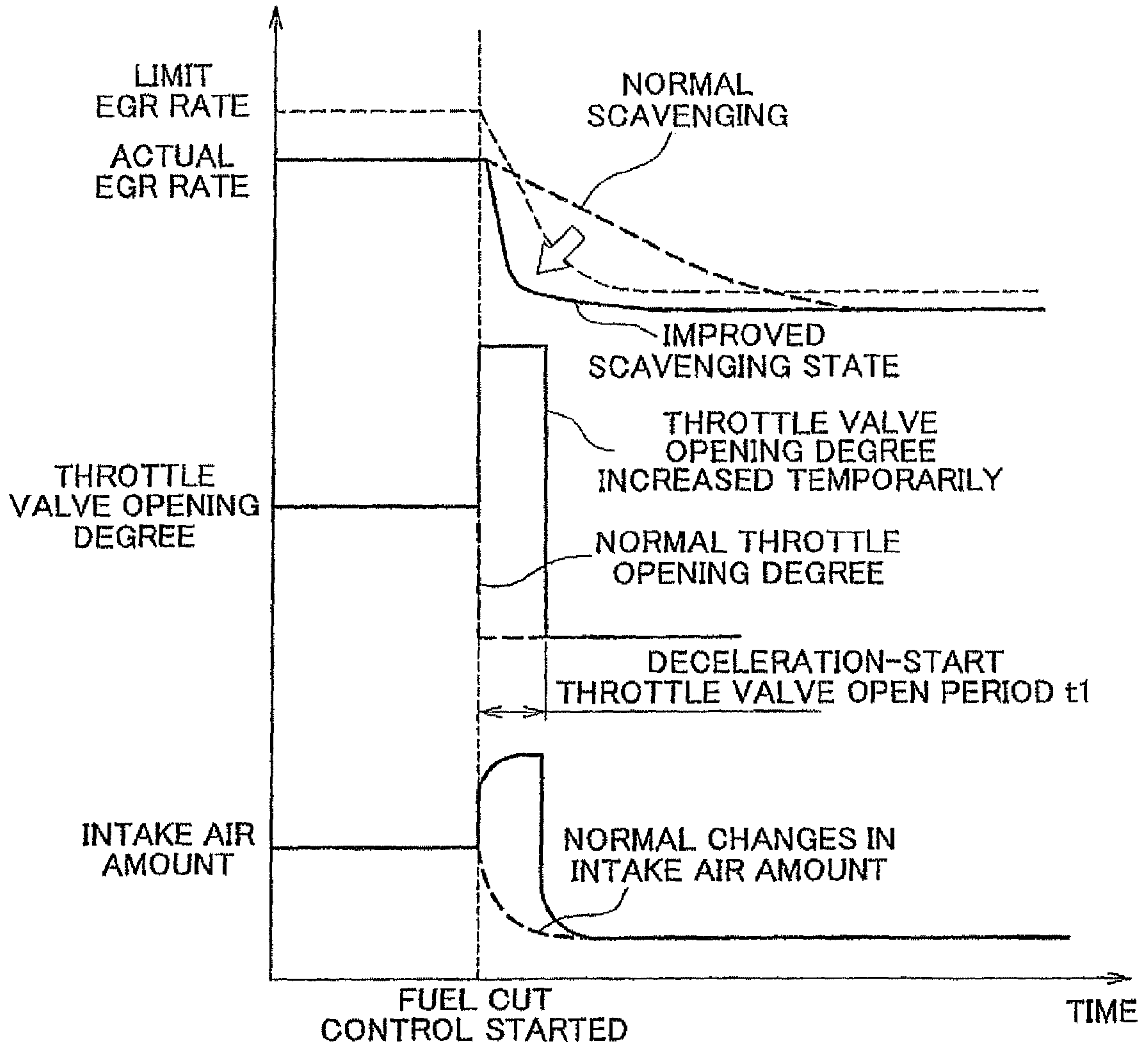
FIG. 10 is a chart that illustrates changes in throttle valve opening degree, intake air amount, limit EGR rate, and actual EGR rate in accordance with a fourth embodiment of the present invention.

FIG. 10 shows a chart that illustrates changes in throttle valve opening degree, intake air amount, limit EGR rate, and actual EGR rate that occur when the control in accordance with this embodiment is executed. In FIG. 10, the horizontal axis represents the time, and the vertical axis represents the limit EGR rate and the actual EGR rate, the throttle valve opening degree, and the intake air amount. In this embodiment, the throttle valve 14 is fully opened when the operation of the internal combustion engine begins decelerating and the fuel, cut control is executed. The throttle valve 14 is maintained fully open during a deceleration-start throttle valve open period t1 and then fully closed.

Here, the actual EGR rate in the EGR gas retention area of the internal combustion engine 1 may be sufficiently reduced by scavenging over the deceleration-start throttle valve open period t1 so that the actual EGR rate will not exceed the limit EGR rate, thereby avoiding unstable combustion. The deceleration-start throttle valve open period t1 may be obtained empirically.

In FIG. 10, when the fuel cut control is started and the throttle valve 14 is opened and then closed at the same time, the intake air amount increases abruptly temporarily and decreases abruptly after the deceleration-start throttle valve open period t1 as shown in the lower portion of FIG. 10. Accordingly, when the fuel cut control is started, the actual EGR rate is also abruptly decreased so as not to exceed the limit EGR rate as shown in the upper portion of FIG. 10. In this way, it is possible to prevent the induction of an excessive amount of EGR gas into the cylinder 2 and thereby destabilize combustion.

Figure 11:
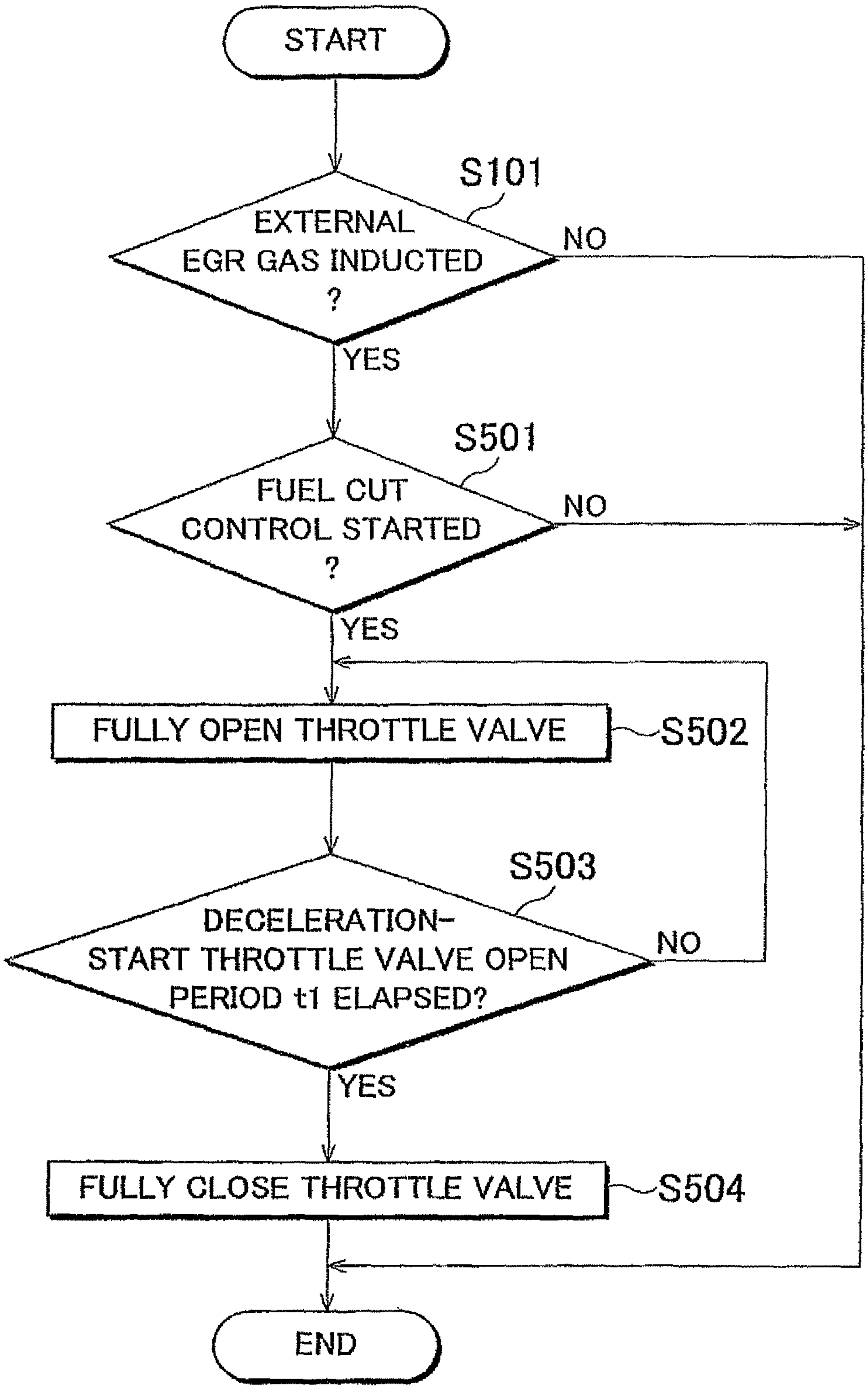
FIG. 11 is a flowchart that shows a deceleration-start throttle valve control routine in accordance with the fourth embodiment of the present invention.

FIG. 11 shows a flowchart of a deceleration-start throttle valve control routine in accordance with the fourth embodiment. This routine is a program stored in the ROM of the ECU 20 and executed repeatedly every specified time during operation of the internal combustion engine 1.

When the routine is started, first in step S101, it is determined whether external EGR gas is inducted. If it is determined that external EGR gas is not inducted, the routine ends. If it is determined that external EGR gas is inducted, on the other hand, the routine proceeds to step S501.

In step S501, it is determined whether the fuel cut control has been started. Specifically, the determination may be made according to a drive signal from the ECU 20 to the fuel injection valve 10, or by reading the value of a fuel cut flag, which turns on when fuel cut control is started. That is, it is determined that the fuel cut control has been started if it is not executed in a preceding step S501 but it is executed in the current step S501.

If is determined that the fuel cut control has not been started, the routine ends. If it is determined that the fuel cut control has been started, on the other hand, the routine proceeds to step S502.

In step S502, the throttle valve 14 is fully opened. This abruptly increases the intake air amount, which increases the scavenging efficiency for the intake system. When the process of step S502 is finished, the routine proceeds to step S503.

In step S503, it is determined whether the deceleration-start throttle valve open period t1 has elapsed after the throttle valve 14 is opened. If it is determined that the deceleration-start throttle valve open period t1 has not elapsed, the routine returns to the step S502. If it is determined that the deceleration-start throttle valve open period t1 has elapsed, the routine proceeds to step S504.

In step S504, the throttle valve 14 is fully closed. When the process of step S504 is finished, the routine is ended.

According to this embodiment, the throttle valve 14 is fully opened over the deceleration-start throttle valve open period t1 when the internal combustion engine 1 begins decelerating and the fuel cut control is started, and fully closed after the EGR gas present in the intake system (EGR gas retention area) of the internal combustion engine 1 is sufficiently scavenged.

Consequently, it is possible to improve the scavenging efficiency for the intake system of the internal combustion engine 1, prevent the actual EGR rate from exceeding the limit EGR rate, and provide a sufficient deceleration feel by fully closing the throttle valve 14 immediately after the deceleration-start throttle valve open period t1 elapses. The processes of step S501 to step S504 are equivalent to the "deceleration opening/closing control" of the present invention.

Next, a fifth embodiment of the present invention is described. In this embodiment, the throttle valve 14 is controlled when the fuel cut control is started by varying the duration for which the throttle valve 14 remains open according to the actual EGR rate when the fuel cut control is started as well as the control described in relation to any of Embodiments 1 to 3 is executed.

Here, as the amount of EGR gas remaining in the intake system (EGR gas retention area) of the internal combustion engine 1 when the fuel cut control is started increases, the throttle valve 14 needs to be open for a longer time in order to adequately scavange the EGR gas. Thus, in this embodiment, the valve open period of the throttle valve 14 is varied based on the amount of EGR gas remaining in the intake system (EGR gas retention area) of the internal combustion engine 1 when the fuel cut control is started.

Consequently, the throttle valve 14 may be kept fully open for just a period sufficient to scavenge the EGR gas remaining in the EGR gas retention area. Thus, it is possible to avoid the disadvantage that a large amount of EGR gas remains in the EGR gas retention area after the throttle valve 14 is closed to destabilize combustion and the disadvantage that the throttle valve 14 is kept open so long that a deceleration feel cannot be had for an unnecessarily long period.

Figure 12A:
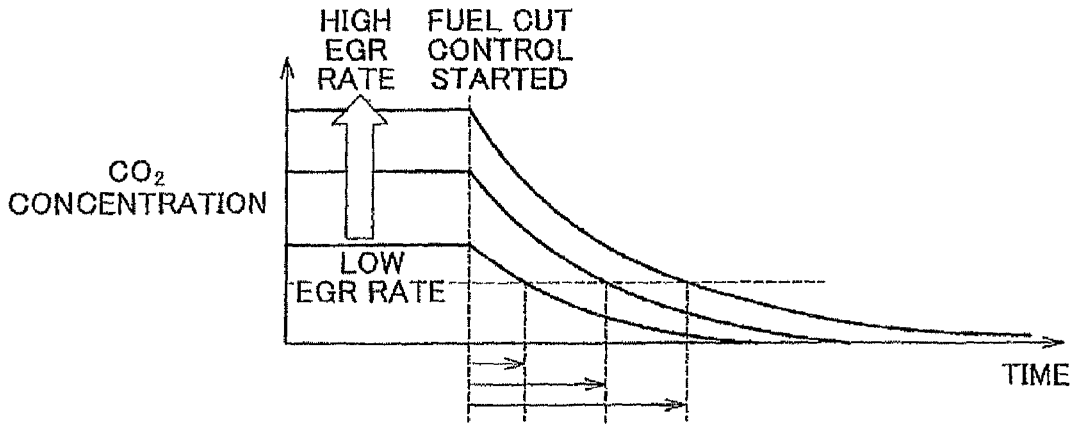
FIGS. 12A and 12B are each a chart that illustrates the relationship between the valve open period of a throttle valve and the amount of EGR gas present in an EGR gas retention area in accordance with a fifth embodiment of the present invention.
Figure 12B:
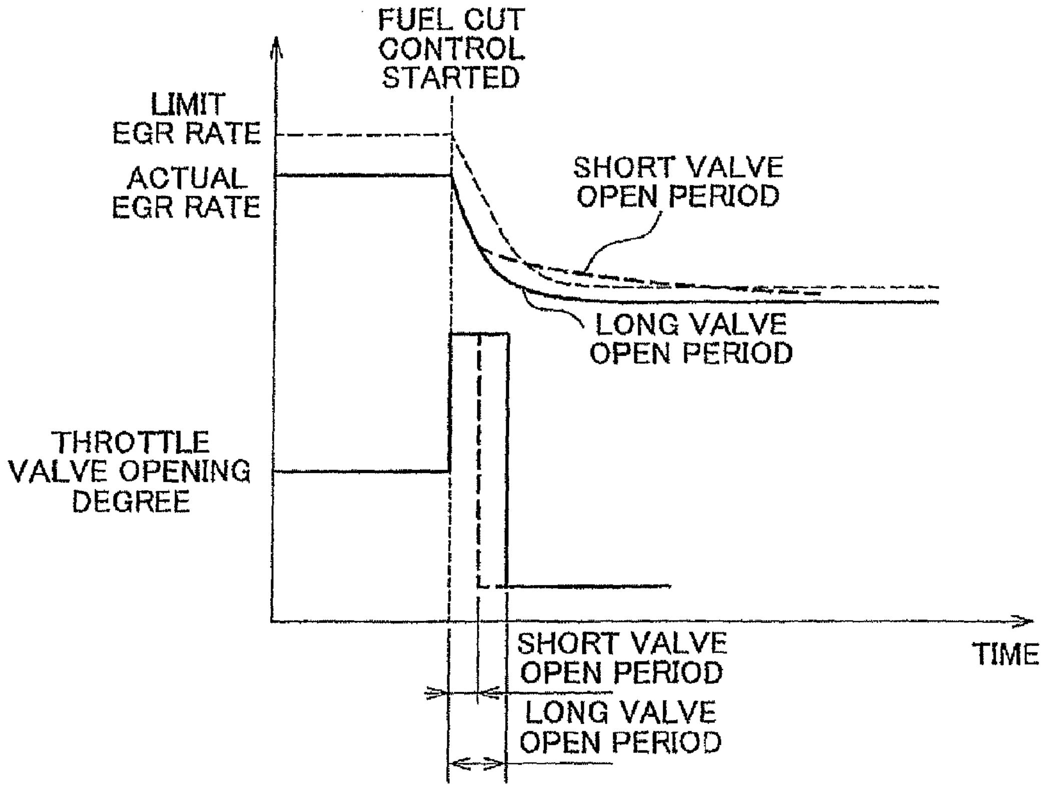

FIGS. 12A and 12B are each a chart that illustrates the relationship between the valve open period of the throttle valve 14 and the amount of EGR gas present in the EGR gas retention area. FIG. 12A shows a graph that shows how the $CO_2$ concentration changes after the throttle valve is fully opened at the same time as the fuel cut control is started depending on the EGR rate at the time when the fuel cut control is started.

As shown in FIG. 12A, as the EGR rate is higher when the fuel cut control is started, a more time is needed to sufficiently decrease the $CO_2$ concentration by scavenging. FIG. 12B is a graph that shows changes in actual EGR rate that occur when the valve open period is sufficient and when valve open period is insufficient once the throttle valve 14 is opened when the fuel cut control is started. In FIG. 12, the solid line corresponds to the case where the valve open period is sufficient, and the broken line corresponds to the case where the valve open period is insufficient.

As can be seen from FIG. 12B, if the valve open period of the throttle valve 14 is short, the decrease gradient of actual EGR rate decreases after the throttle valve 14 is closed. Therefore, the actual EGR rate may exceed the limit EGR rate and thereby destabilize combustion.

So, in this embodiment, an optimum deceleration-start throttle valve open period t2 is determined based on the EGR rate or the EGR gas amount when the fuel cut control is started and the opening degree of the throttle valve 14 during valve opening control. This can suppress unstable combustion more reliably. The optimum deceleration-start throttle valve open period t2, which is determined based on the relationship between the EGR rate or the EGR gas amount when the fuel cut control is started and the opening degree of the throttle valve 14 during the valve opening control, is the duration over which the throttle valve 14 remains open that minimizes unstable combustion, and may be determined empirically.

Figure 13:
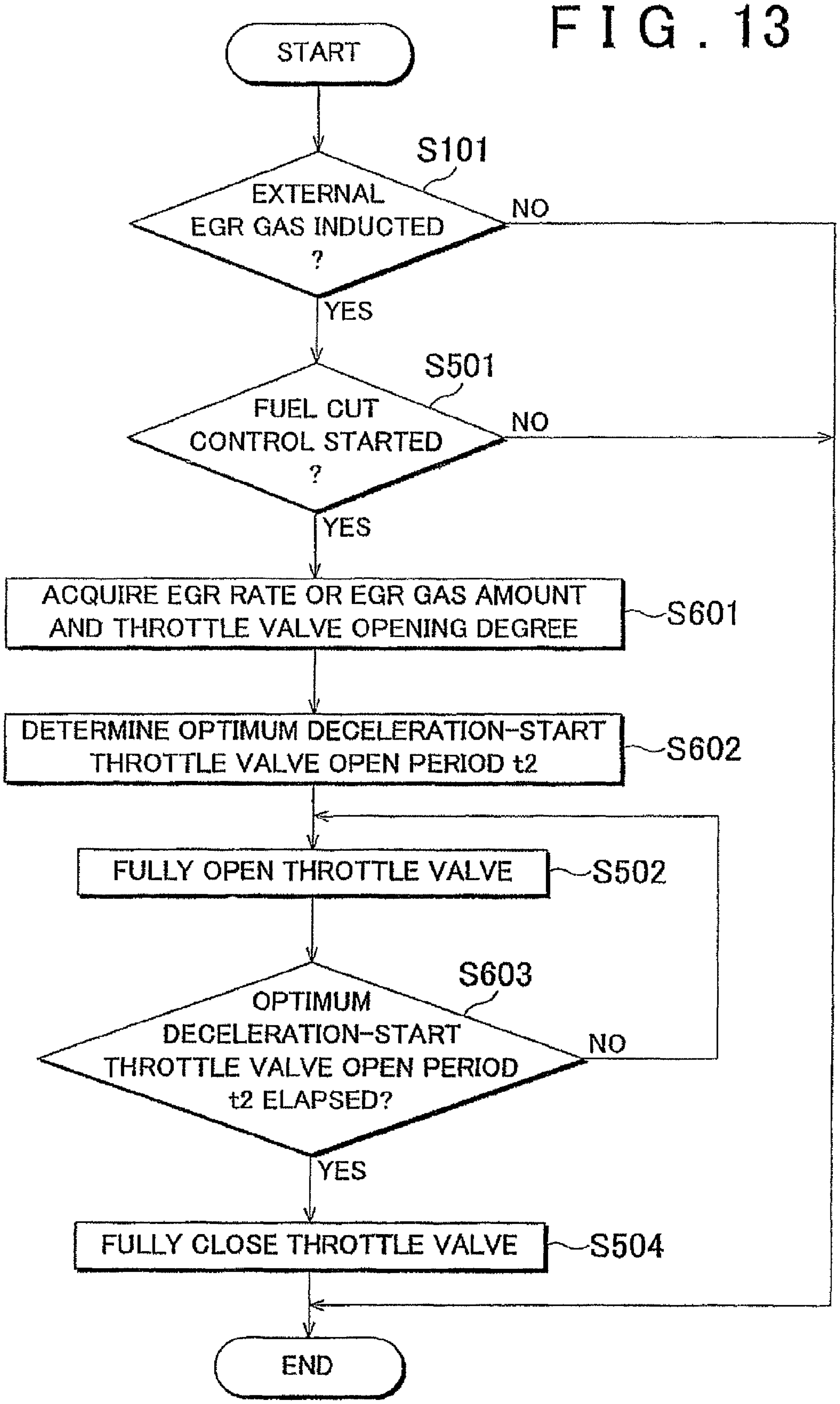
FIG. 13 is a flowchart that shows a deceleration-start throttle valve control routine 2 in accordance with the fifth embodiment of the present invention.

FIG. 13 shows a flowchart of a deceleration-start throttle valve control routine 2 in accordance with the fifth embodiment. When this routine is started, the processes of step S101 and step S501 are executed. These processes are equivalent to those of the deceleration-start throttle valve control routine and thus are not described here. In this routine, if it is determined in step S501 that the fuel cut control has been started, the routine proceeds to step S601.

In step S601, the EGR rate or the EGR gas amount when the fuel cut control is started and the throttle valve opening degree are acquired. The EGR rate or the EGR gas amount may be estimated using a known model from EGR valve opening degree, intake pipe pressure, exhaust pressure, EGR gas temperature, and so forth. In this routine, the throttle valve 14 is kept fully open during the valve opening control. When the process of step S601 ends, the routine proceeds to step S602.

In step S602, the optimum deceleration-start throttle valve open period 12 is derived from the EGR rate or the EGR gas amount and the throttle valve opening degree acquired in step S601. Specifically, the duration of t2 appropriate for the EGR rate or the EGR gas amount and the throttle valve opening degree acquired in step S601 is read from a map that stores the relationship among the EGR rate or the EGR gas amount, the throttle valve opening degree, and the optimum deceleration-start throttle valve open period t2. When the process of step S602 ends, the routine proceeds to step S502.

In step S502, the throttle valve 14 is fully opened. This abruptly increases the intake air amount to, which increases the scavenging efficiency of the intake system. When the process of step S502 is finished, the routine proceeds to step S603.

In step S603, it is determined whether the optimum deceleration-start throttle valve open period t2 has elapsed since the throttle valve 14 was opened. If it is determined that the optimum deceleration-start throttle valve open period t2 has not elapsed, the routine returns to the step S502. If it is determined that the optimum deceleration-start throttle valve open period t2 has elapsed, the routine proceeds to step S504.

In step S504, the throttle valve 14 is fully closed. When the process of step S504 is finished, the routine ends.

In this embodiment, the EGR rate or the EGR gas amount when the fuel cut control is started and the throttle valve opening degree are acquired, and the optimum deceleration-start throttle valve open period t2, which is optimum for sufficiently lowering the EGR rate to complete scavenging, is derived based on these values. After the fuel cut control is started, the throttle valve is kept fully open over the derived optimum deceleration-start throttle valve open period t2. The valve open period of the throttle valve 14 may be increased as the amount of EGR gas present in the intake system increases.

According to this configuration, the valve open period of the throttle valve 14 can be optimized after the fuel cut control is started in accordance with the state of EGR gas when the fuel cut control is started. Therefore, the rate of EGR gas that is actually inducted into the cylinder 2 may be more precisely maintained below the limit EGR rate. As a result, unstable combustion is more reliably suppressed.

Next, a sixth embodiment of the present invention is described. In this embodiment, in addition to the controls described in the first through third embodiments, the throttle valve 14 is fully opened when the fuel cut control is started and is then gradually closed after it has been fully opened.

Here, if the control of the fourth embodiment or the fifth embodiment is executed, the throttle valve 14 is fully opened when the fuel cut control is started, then maintained fully open over a predetermined period, and thereafter fully closed. In this way, however, it may take some time until the driver feels the vehicle decelerating.

Figure 14:
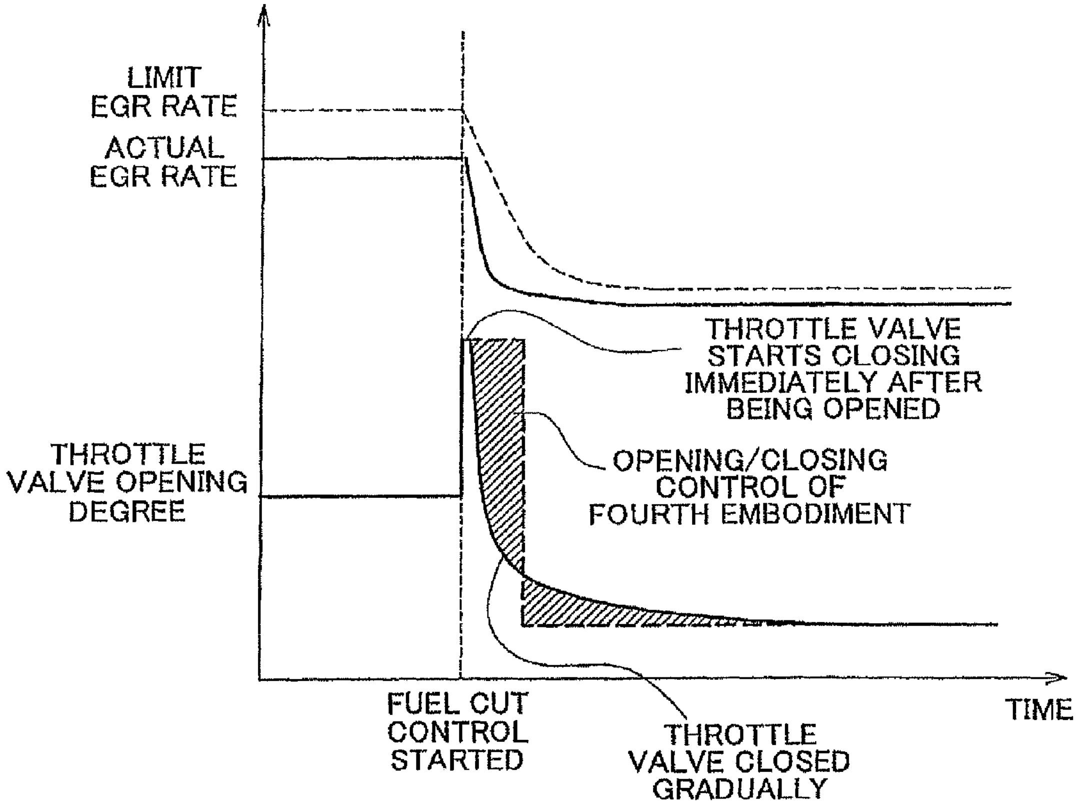
FIG. 14 is a chart that shows changes in throttle valve opening degree and changes in EGR rate in association therewith in accordance with a sixth embodiment of the present invention.

So, in this embodiment, the throttle valve 14 is temporarily fully opened when the fuel cut control starts and is thereafter gradually closed. FIG. 14 is a graph that shows changes in opening degree of the throttle valve 14 and associated changes in EGR rate in accordance with this embodiment.

As shown in FIG. 14, in this embodiment, the throttle valve 14 opens fully with the start of the fuel cut control and then gradually closes thereafter. The upper left and lower right hatched portions in FIG. 14 are equal in area, that is, the total intake air amount is the same between the case where the valve opening/closing control described in relation to Embodiment 4 is executed and the case where the valve opening/closing control in accordance with this embodiment is executed. This makes it possible to scavenge the EGR gas remaining in the EGR gas retention area more reliably in order to suppress unstable combustion more reliably, and give the driver a deceleration feel quickly enough as well.

Figure 15:
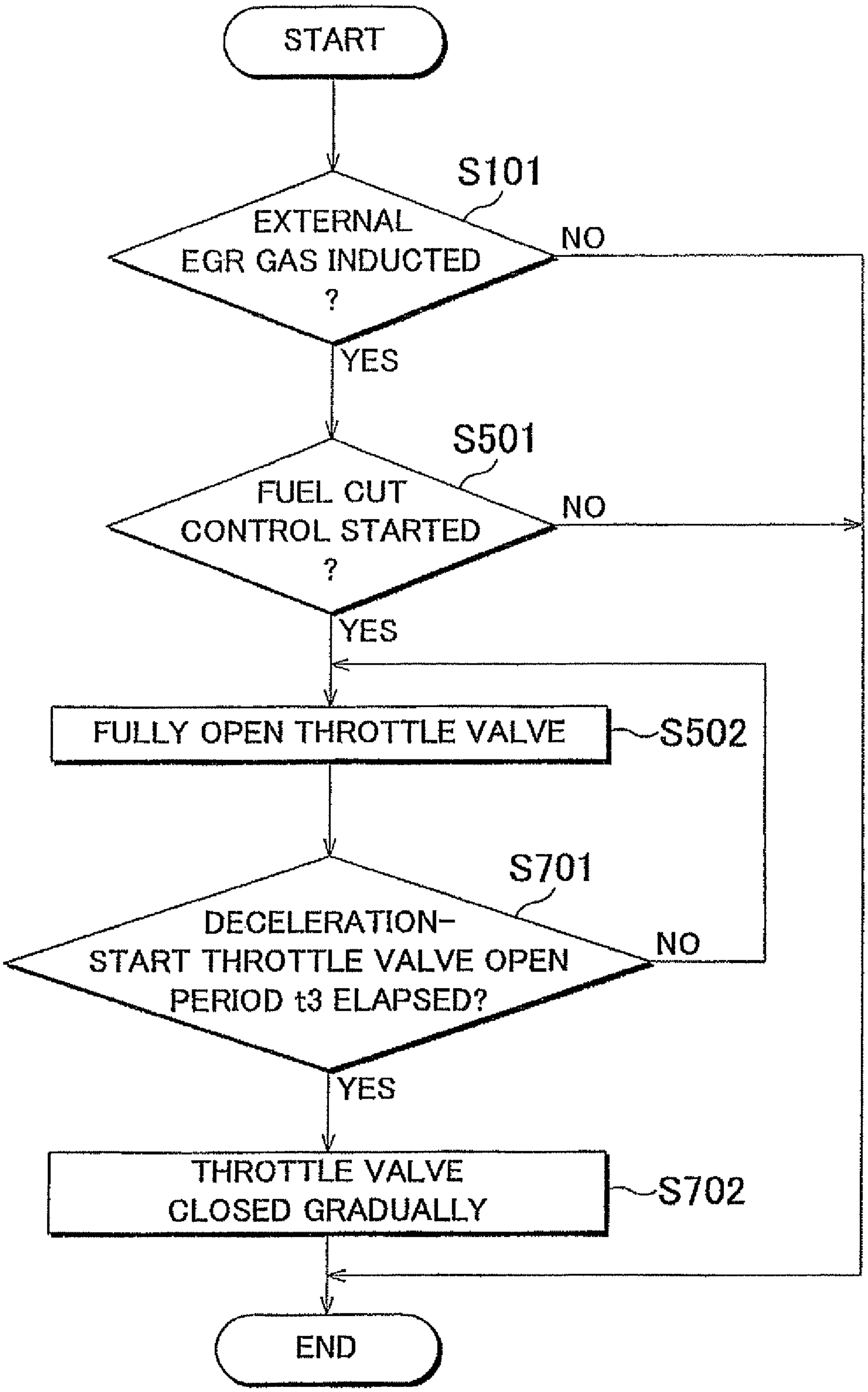
FIG. 15 is a flowchart that shows a deceleration-start throttle valve control routine 3 in accordance with the sixth embodiment of the present invention.

FIG. 15 shows a flowchart of a deceleration-start throttle valve control routine 3 in accordance with this embodiment. This routine differs from the deceleration-start throttle valve control routine shown in FIG. 11 that the processes of step S701 to step S702 are executed instead of the processes of step S503 to step S504. Hereinafter, only the differences of this routine from the deceleration-start throttle valve control routine will be described.

The routine proceeds to step S701 after the throttle valve 14 is fully opened in S502. In step S701, it is determined whether the deceleration-start throttle valve open period t3 has elapsed since the throttle valve 14 was opened. The duration of deceleration-start throttle valve open period t3, which is shorter than the deceleration-start throttle valve open period t1, is set so that the driver is unlikely to experience any discomfort that deceleration is delayed if the throttle valve 14 remains fully open over that period of time. If it is determined that the deceleration-start throttle valve open period t3 has not elapsed, the routine returns to the point before step S502. If it is determined that the deceleration-start throttle valve open period t3 has elapsed, the routine proceeds to step S702.

In S702, the throttle valve 14 is gradually closed as indicated by the curve shown in FIG. 14. When step S702 is finished, the routine ends. The throttle valve 14 may be opened for a predetermined period and then closed gradually.

In this embodiment, the throttle valve 14 is fully opened temporarily when the fuel cut control is started, remains fully open for such a short period that will not give the driver a sense of discomfort, and is then dosed gradually.

In this way, it is possible to improve the scavenging efficiency of the intake system to suppress unstable combustion and provide an appropriate deceleration feel to the driver. The deceleration-start throttle valve open period t3 of this embodiment serves as the "normal deceleration feel maintaining period" of the present invention.

In the fourth embodiment to the sixth embodiment, the throttle valve 14 is fully opened when the fuel cut control is started. It should be understood, however, that the throttle valve 14 may not necessarily be fully opened at that time.

The invention claimed is:

1. A control device for an internal combustion engine, comprising:

an EGR assembly that includes an EGR passage to communicate an exhaust passage and an intake passage of the internal combustion engine and an EGR valve to control an amount of exhaust gas that passes through the EGR passage, wherein the EGR assembly recirculates a portion of the exhaust gas to the intake passage as EGR gas;

a fuel cut control section that executes a fuel cut control, in which fuel injection in the internal combustion engine is stopped, when the internal combustion engine is decelerating; and a deceleration-cancellation fuel injection control section that, when the internal combustion engine stops decelerating and the fuel cut control is stopped, injects a prescribed amount of fuel for a predetermined period after the fuel cut control is stopped such that the prescribed amount when an amount of EGR gas present in an intake system of the internal combustion engine is larger is equal to or smaller than that when the amount of such EGR gas is smaller, wherein the amount of EGR gas present in the intake system of the internal combustion engine when the fuel cut control is stopped is estimated based on at least one of (i) an operational state of the internal combustion engine immediately before the fuel cut control is executed, and (ii) a state of the EGR assembly immediately before the fuel cut control is executed.

2. A control device for an internal combustion engine, comprising:

an EGR assembly that includes an EGR passage to communicate an exhaust passage and an intake passage of the internal combustion engine and an EGR valve to control an amount of exhaust gas that passes through the EGR passage, wherein the EGR assembly recirculates a portion of the exhaust gas to the intake passage as EGR gas;

a fuel cut control section that executes a fuel cut control, in which fuel injection in the internal combustion engine is stopped, when the internal combustion engine is decelerating;

a deceleration-cancellation fuel injection control section that, when the internal combustion engine stops decelerating and the fuel cut control is stopped, injects a prescribed amount of fuel for a predetermined period after the fuel cut control is stopped such that the prescribed amount when an amount of EGR gas present in an intake system of the internal combustion engine is larger is equal to or smaller than that when the amount of such EGR gas is smaller; and an EGR gas amount control section that stops recirculation of exhaust gas by the EGR assembly when the operational state of the internal combustion engine is in a specified non-EGR region under a low load and at a low speed, and that recirculates EGR gas using the EGR assembly in an amount in accordance with the operational state of the internal combustion engine when the operational state of the internal combustion engine is in an EGR region under a higher load or at a higher speed than in the non-EGR region, wherein the prescribed amount is set to be smaller when the operational state of the internal combustion engine immediately before the fuel cut control is executed is in the EGR region than when it is in the non-EGR region.

3. The control device according to claim 1, wherein a deceleration opening/closing control, in which a throttle valve provided in the intake passage of the internal combustion engine is temporarily opened and then closed, is executed when the internal combustion engine begins decelerating and the fuel cut control is started.

4. The control device according to claim 3, wherein a valve open period of the throttle valve in the deceleration opening/closing control is set based on the amount of EGR gas present in the intake system of the internal combustion engine when the fuel cut control is started.

5. The control device according to claim 4, wherein the valve open period of the throttle valve is increased as the amount of EGR gas present in the intake system of the internal combustion engine increases.

6. The control device according to claim 3, wherein a valve open period of the throttle valve in the deceleration opening/closing control is equal to or shorter than a specified normal deceleration feel maintaining time, which does not make a driver feel that deceleration is delayed, and the throttle valve is initially closed at the same rate as it is opened and then closed at a gradually reduced rate.

7. The control device according to claim 3, wherein the throttle valve is opened for a specified time and then closed gradually.

8. The control device according to claim 1, wherein the predetermined period after the fuel cut control is stopped occurs until an air-fuel ratio sensor is activated and feedback control of the fuel injection is restarted.

9. The control device according to claim 2, wherein the predetermined period after the fuel cut control is stopped occurs until an air-fuel ratio sensor is activated and feedback control of the fuel injection is restarted.

* * * * *